(12) United States Patent
Popovich et al.

(10) Patent No.: US 12,172,275 B2
(45) Date of Patent: *Dec. 24, 2024

(54) FASTENER DRIVING TOOL

(71) Applicant: Illinois Tool Works Inc., Glenview, IL (US)

(72) Inventors: Michael Stephen Popovich, Bartlett, IL (US); Stephen Patrick Moore, Palatine, IL (US); Walter Taylor, Mchenry, IL (US); Alex Daniel Makeyev, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,657

(22) Filed: Jul. 26, 2022

(65) Prior Publication Data

US 2022/0355457 A1 Nov. 10, 2022

Related U.S. Application Data

(63) Continuation of application No. 16/989,311, filed on Aug. 10, 2020, now Pat. No. 11,426,851.

(60) Provisional application No. 62/889,904, filed on Aug. 21, 2019.

(51) Int. Cl.
*B25C 1/08* (2006.01)
*B25C 5/10* (2006.01)

(52) U.S. Cl.
CPC . *B25C 1/08* (2013.01); *B25C 5/10* (2013.01)

(58) Field of Classification Search
CPC .......... B25C 1/08; B25C 1/10; B25C 1/1008; B25C 1/04; B25C 1/06
See application file for complete search history.

(56) References Cited

U.S. PATENT DOCUMENTS

| | | | |
|---|---|---|---|
| 4,403,722 A | 9/1983 | Nikolich | |
| 4,483,474 A | 11/1984 | Nikolich | |
| 6,526,926 B1 | 3/2003 | Towfighi | |
| 7,478,740 B2 | 1/2009 | Shea et al. | |
| 7,571,841 B2 | 8/2009 | Gibson et al. | |
| 7,584,723 B2 | 9/2009 | Shkolnikov et al. | |
| 7,654,429 B2 | 2/2010 | Shea et al. | |
| 7,703,648 B2 | 4/2010 | Tamura et al. | |
| 7,841,500 B2* | 11/2010 | Ho | B25C 1/08 227/9 |
| 8,302,831 B2* | 11/2012 | Taylor | B25C 1/08 227/9 |

(Continued)

FOREIGN PATENT DOCUMENTS

WO WO 2015/134076 9/2015

OTHER PUBLICATIONS

International Search Report and Written Opinion from International Application No. PCT/US2020/045732, mailed Sep. 22, 2020 (14 pages).

*Primary Examiner* — Veronica Martin
(74) *Attorney, Agent, or Firm* — Neal, Gerber & Eisenberg LLP

(57) ABSTRACT

Various embodiments of the present disclosure provide a combustion powered fastener driving tool including a fuel cell receiver configured to receive and engage a fuel cell metering valve of a fuel cell, the fuel cell metering valve configured to dispense a dose of fuel from the fuel cell.

14 Claims, 17 Drawing Sheets

(56) References Cited

U.S. PATENT DOCUMENTS

| | | | | |
|---|---|---|---|---|
| 8,939,339 | B2* | 1/2015 | Vanstaan | B25C 1/08 |
| | | | | 227/9 |
| 9,802,303 | B2 | 10/2017 | Vanstaan et al. | |
| 10,166,666 | B2 | 1/2019 | Shea et al. | |
| 11,426,851 | B2* | 8/2022 | Popovich | B25C 5/10 |
| 2002/0043547 | A1 | 4/2002 | Shkolnikov et al. | |
| 2007/0074706 | A1* | 4/2007 | Wagdy | B25C 1/08 |
| | | | | 123/495 |
| 2007/0251967 | A1* | 11/2007 | Taylor | B25C 1/08 |
| | | | | 227/10 |
| 2008/0000451 | A1* | 1/2008 | Shea | B25C 1/08 |
| | | | | 227/120 |
| 2008/0110953 | A1* | 5/2008 | Gibson | B65D 83/24 |
| | | | | 429/513 |
| 2011/0049212 | A1* | 3/2011 | Taylor | B25C 1/08 |
| | | | | 227/9 |
| 2011/0248063 | A1 | 10/2011 | Taylor et al. | |
| 2012/0267417 | A1* | 10/2012 | Vanstaan | B25C 1/08 |
| | | | | 227/9 |

\* cited by examiner

FASTENER DRIVING TOOL

PRIORITY

This patent application is a continuation of and claims priority to and the benefit of U.S. patent application Ser. No. 16/989,311, filed Aug. 10, 2020, which claims the benefit of and priority to U.S. Provisional Application No. 62/889,904, filed Aug. 21, 2019, the entire contents of each of which are incorporated by reference herein.

FIELD

The present disclosure relates to fastener driving tools. More specifically, the present disclosure relates to combustion powered fastener driving tools.

BACKGROUND

Generally, powered fastener driving tools use one of several types of power sources to carry out a fastener driving cycle to drive a fastener (such as a nail or a staple) into a workpiece. More specifically, a powered fastener driving tool uses a power source to force a driving assembly, such as a piston carrying a driver blade, through a cylinder from a pre-firing position to a firing position. As the driving assembly moves to the firing position, the driver blade travels through a nosepiece, which guides the driver blade to contact a fastener housed in the nosepiece. Continued movement of the driving assembly through the cylinder toward the firing position forces the driver blade to drive the fastener from the nosepiece into the workpiece. The driving assembly is then forced back to the pre-firing position in a way that depends on the tool's construction and power source. A fastener advancing device forces another fastener from a magazine into the nosepiece, and the tool is ready to fire again.

Combustion powered fastener driving tools are one type of powered fastener driving tools that typically use a small internal combustion assembly as their power source. To operate various known combustion powered fastener driving tools, an operator depresses a workpiece contact element of the tool onto a workpiece. This moves the workpiece contact element from an extended position to a retracted position, which causes one or more mechanical linkages to cause: (1) a valve sleeve to move to a sealed position to seal a combustion chamber that is in fluid communication with the cylinder; and (2) a fuel delivery system to dispense fuel from a fuel cell into the (now sealed) combustion chamber.

The operator then pulls the trigger to actuate a trigger switch, thereby causing a spark generator to deliver a spark and ignite the fuel/air mixture in the combustion chamber to start the fastener driving cycle. This generates high-pressure combustion gases that expand and act on the piston to force the driving assembly to move through the cylinder from the pre-firing position to the firing position, thereby causing the driver blade to contact a fastener housed in the nosepiece and drive the fastener from the nosepiece into the workpiece.

The fuel delivery system is configured to dispense only a desired amount of fuel to the combustion chamber for each combustion event. The amount of fuel should be carefully monitored to provide the desired combustion in a fuel efficient manner to prolong the working life of the fuel cell. Accordingly, the combustion powered fastener driving tools include a fuel actuation member which engages with the fuel delivery system before each combustion cycle to dispense the desired dose of fuel from the fuel canister.

Actuation of the fuel actuation member provides forces required by the fuel delivery system to dispense the desired dose of fuel. However, current fuel delivery systems of combustion powered fastener driving tools rely on a flexible door member to support the fuel actuation member. The behavior of the flexible door member changes with heat, dimensional tolerances, age, and other such conditions. As a result, the flexible door member may provide variable support to the fuel actuation member causing the fuel delivery system to dispense an inconsistent dose of fuel under certain conditions. Thus, there is a need for a combustion powered fastener driving tool that provides consistent and stable support to the fuel actuation member such that the fuel delivery system dispenses a consistent dose of fuel.

SUMMARY

Various embodiments of the present disclosure provide a combustion powered fastener driving tool that solves the above problems in part by including more rigid support for a fuel dosing lever to ensure consistent dispensing of the desired amount of fuel.

In various example embodiments of the present disclosure, the fastener driving tool includes a main housing, a fastener driving assembly at least partially positioned in, connected to and supported by the main housing, a handle assembly connected to the main housing, a trigger assembly connected to the main housing, a fastener magazine assembly connected to the main housing and the handle assembly, a workpiece contact assembly connected to the main housing, and a fuel cell receiving assembly at least partially positioned in, supported by, and connected to the main housing. The fuel cell receiving assembly includes a fuel cell receiver configured to receive and engage a fuel cell metering valve of a fuel cell that dispenses a dose of fuel from the fuel cell, and a fuel dosing lever pivotally supported within the main housing of the fastener driving tool.

In certain such example embodiments, the fuel dosing lever includes a dosing lever base, a first dosing lever arm connected to a first end of the dosing lever base, a second dosing lever arm connected to a second end of the dosing lever base, a first dosing lever pivot pin connected to and transversely extending from the first dosing lever arm, a second dosing lever pivot pin connected to and transversely extending from the second dosing lever arm, a first dosing lever engagement end connected to the first dosing lever arm, and a second dosing lever engagement end connected to the second dosing lever arm.

In certain such example embodiments, the fastener driving assembly includes a cylinder head, the cylinder head including a cylinder head body, a first pivot pin receiving member connected to the cylinder head body configured to receive the first dosing lever pivot pin, and a second pivot pin receiving member connected to the cylinder had body configured to receive the second dosing lever pivot pin. In these example embodiments, the first dosing lever pivot pin is pivotally engaged with the first pivot pin receiving member and the second dosing lever pivot pin is pivotally engaged with the second pivot pin receiving member. The first pivot pin receiving member and the second pivot pin receiving member define the pivot point of the fuel dosing lever.

In certain other such example embodiments, the main housing includes a housing cap, the housing cap includes a housing cap body, a first pivot pin receiving member connected to the housing cap body configured to receive the first dosing lever pivot pin, and a second pivot pin receiving member connected to the housing cap body configured to receive the second dosing lever pivot pin. In these example embodiments, the first dosing lever pivot pin is pivotally engaged with the first pivot pin receiving member and the second dosing lever pivot pin is pivotally engaged with the second pivot pin receiving member. The first pivot pin receiving member and the second pivot pin receiving member define the pivot point of the fuel dosing lever.

Other objects, features, and advantages of the present disclosure will be apparent from the following detailed disclosure and accompanying drawings.

DETAILED DESCRIPTION

Figure 1:
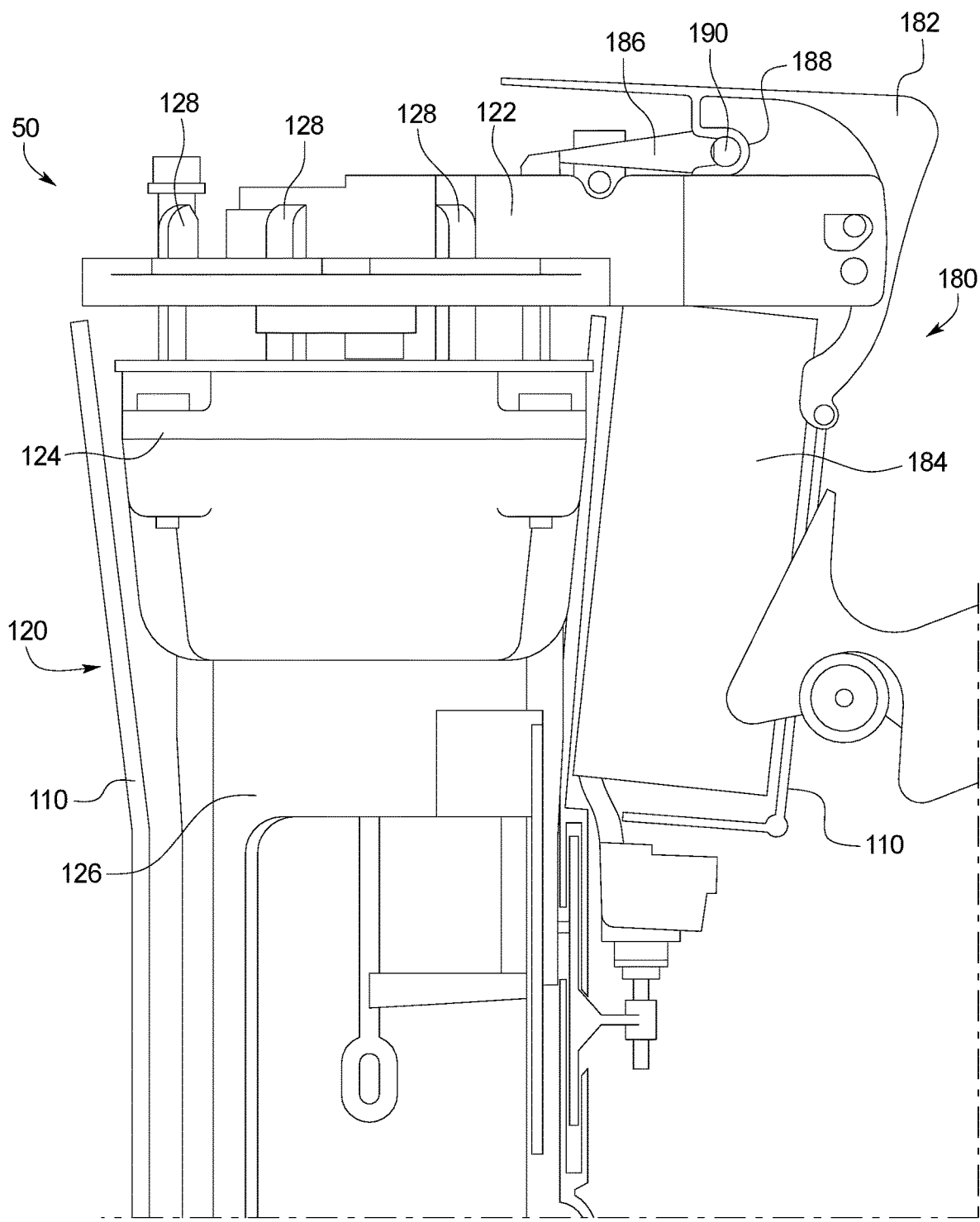
FIG. 1 is an enlarged fragmentary side cross-sectional view of a prior art fastener driving tool, showing a fuel dosing arm mounted on the fuel cell door, and showing the fuel dosing arm in the actuated position.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

For a better understanding of the present disclosure, an example known combustion powered fastener driving tool is first partially described.

Figure 2:
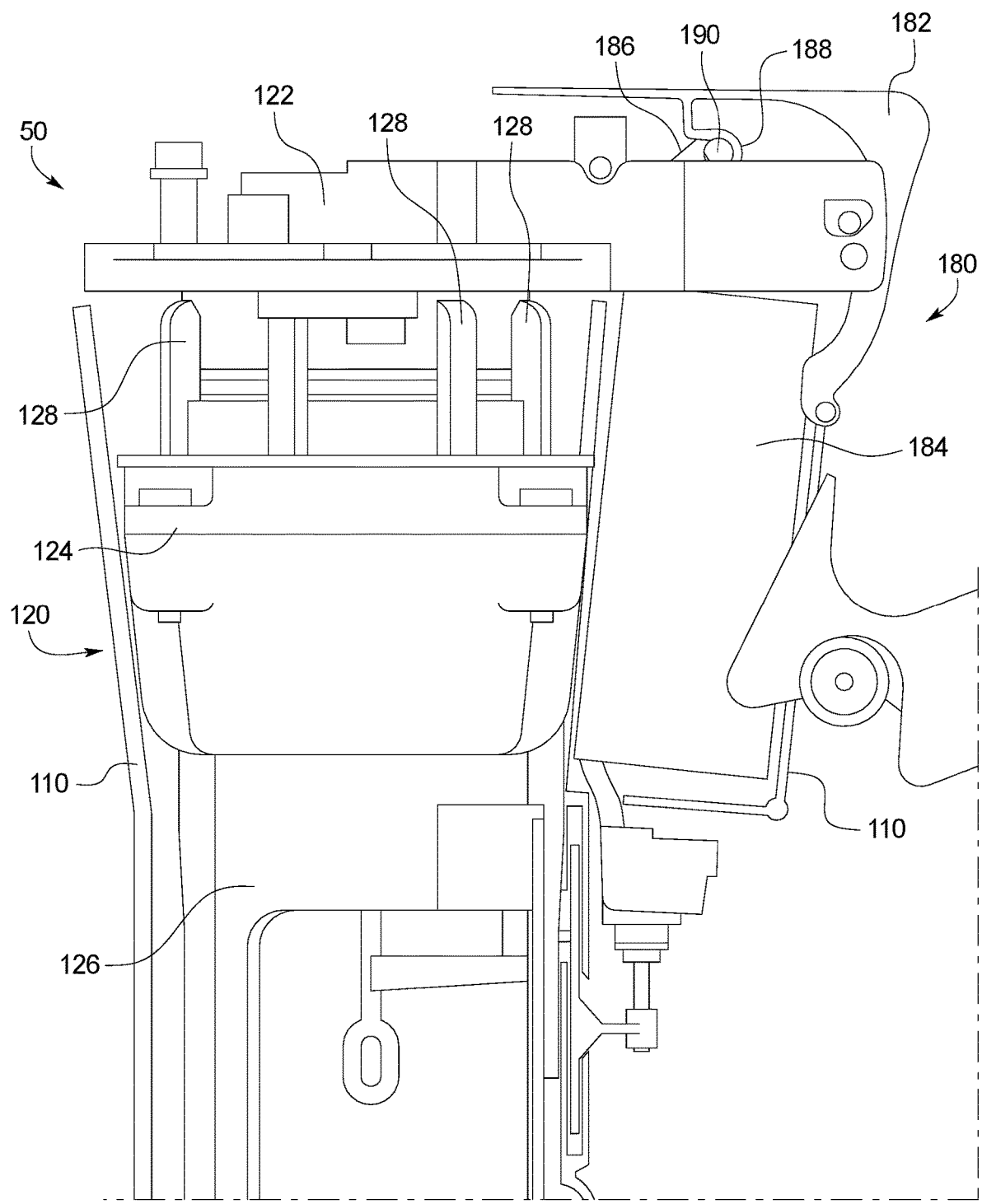
FIG. 2 is an enlarged fragmentary side cross-sectional view of the prior art fastener driving tool of FIG. 1, showing the fuel dosing arm mounted on the fuel cell door, and showing the fuel dosing arm in the non-actuated position.
Figure 3:
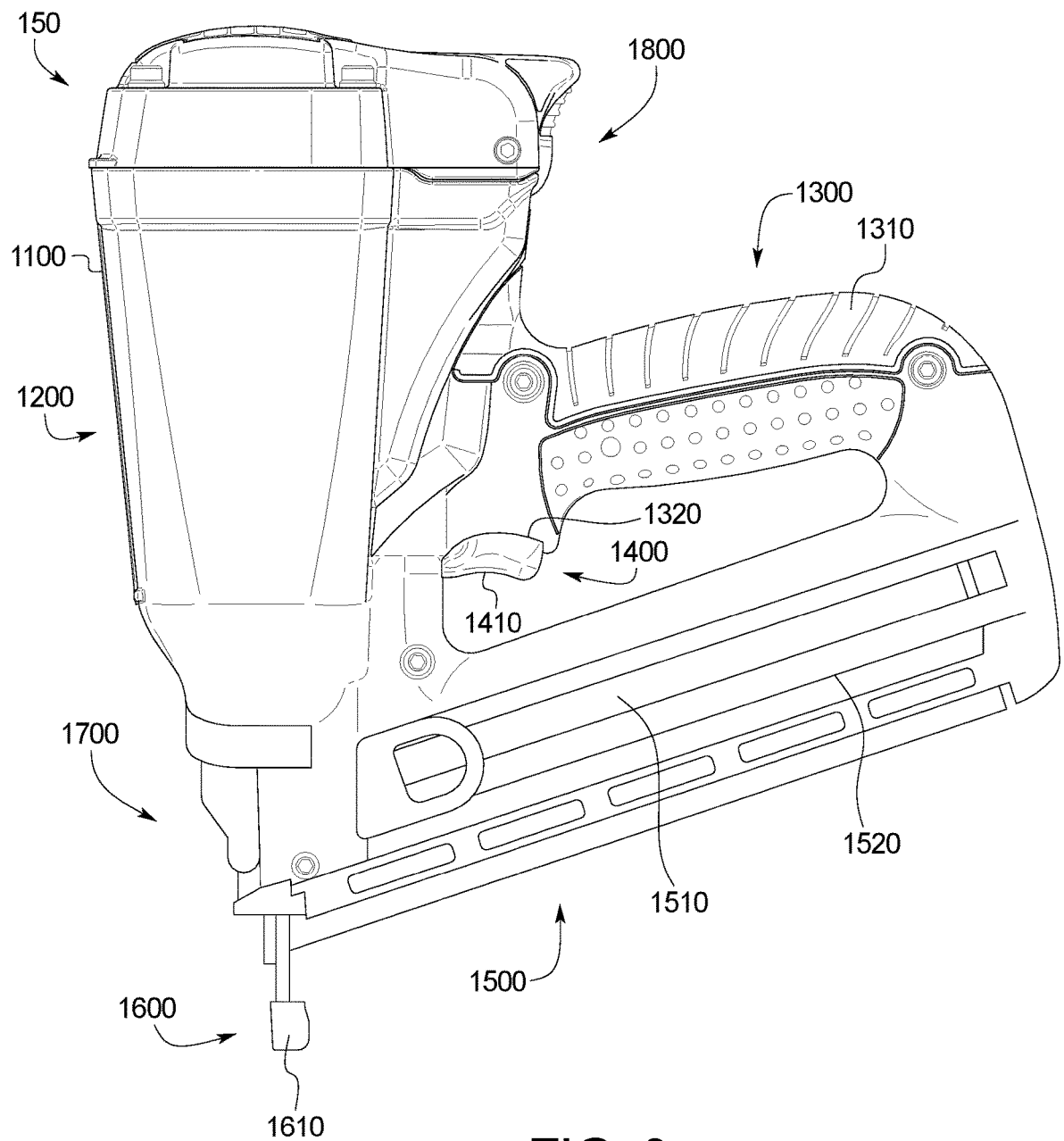
FIG. 3 is a side perspective view of an example embodiment of a fastener driving tool of the present disclosure.

FIGS. 1 and 2 illustrate an example known combustion powered fastener driving tool 50 (and sometimes referred to herein as "known tool" for brevity). FIGS. 1 and 2 show selected components of the example known tool 50 including: (1) a main housing 110; (2) a fastener driving assembly 120 partially positioned in, supported by and connected to the main housing 110; and (3) a fuel cell receiving assembly 180 partially positioned in, supported by, and connected to the main housing 110.

In the illustrated known fastener driving tool 50, the fastener driving assembly 120 includes: (1) a cylinder head 122; (2) a combustion chamber 124 suitably connected to the cylinder head 122; (3) a cylinder 126 suitably connected to the combustion chamber 124; and (4) a plurality of combustion ring fingers 128 suitably connected to an upper portion of the combustion chamber 124.

In the illustrated known fastener driving tool 50, the fuel cell receiving assembly 180 includes: (1) a fuel cell door 182 pivotally connected to the main housing 110; (2) a fuel cell 184 at least partially supported by the main housing 110; (3) a fuel dosing lever 186 connected to and pivotally supported by the fuel cell door 182; and (4) other components not shown such as: a fuel metering valve, a fuel valve stem, a valve stem receiving block, and a fuel line.

In the illustrated known fastener driving tool 50, the fuel cell door 182 includes a lever pivot pin member 188 defined in the fuel cell door 182. The fuel dosing lever 186 includes dosing lever pins 190 that are supported and retained in the lever pivot pin member 188 of the fuel cell door 182. During operation of the known fastener driving tool 50, the dosing lever pins 190 pivot on the lever pivot pin member 188 of the fuel cell door 182 such that the fuel dosing lever 186 provides forces to the fuel cell receiving assembly 180 to dispense a dose of fuel.

However, the fuel cell door 182 of this illustrated known fastener driving tool 50 is made from a flexible material, and particularly plastic. This flexible material is susceptible to material behavior changes caused by heat, material age, environmental conditions, dimensional tolerances, and other such conditions. This fuel cell door 182 may flex or otherwise move during the actuation of the fuel dosing lever 186. As a result, the fuel dosing lever 186 may provide variable and inconsistent forces to the fuel metering valve of the fuel cell receiving assembly 180. Thus, the fuel metering valve may dispense variable and inconsistent doses of fuel during operation of the illustrated known tool 50. The apparatus of the present disclosure overcomes these problems.

FIGS. 3 to 11 illustrate one example embodiment of the combustion powered fastener driving tool of the present disclosure that is generally indicated by numeral 1050 (and sometimes referred to herein as the "tool" for brevity). The illustrated example shows selected components of the tool 1050 during actuation of the tool 1050 to drive a fastener into a workpiece. Other components of the tool 1050 not discussed herein will be readily understood by those skilled in the art.

The illustrated example tool 1050 includes: (1) a main housing 1100; (2) a fastener driving assembly 1200 at least partially positioned in, supported by and connected to the main housing 1100; (3) a handle assembly 1300 supported by and connected to the main housing 1100; (4) a trigger assembly 1400 supported by and connected to the main housing 1100 and the handle assembly 1300; (5) a fastener magazine assembly 1500 supported by and connected to the main housing 1100 and the handle assembly 1300; (6) a workpiece contact assembly 1600 supported by and connected to the main housing 1100; (7) a nosepiece assembly 1700 supported by and connected to a lower portion of the main housing 1100; and (8) a fuel cell receiving assembly 1800 partially positioned in, supported by, and connected to the main housing 1100.

The main housing 1100 includes: (1) a first wall 1110; (2) a second wall 1120 opposite of the first wall; and (3) a housing cap 1130 suitably connected to the first and second walls 1110 and 1120 of the main housing 1100. The main housing 1100 thus provides a suitable protective enclosure for the fastener driving assembly 1200, the fuel cell receiving assembly 1800, and other components of the tool 1050.

The fastener driving assembly 1200 includes: (1) a cylinder head 1210; (2) a combustion chamber 1220 suitably connected to the cylinder head 1210; (4) a fan motor 1230 suitably mounted to the cylinder head 1210 and projecting into the combustion chamber 1220; (3) a cylinder 1240 suitably connected to the combustion chamber 1220; and (4) a plurality of combustion ring fingers 1250 suitably connected to an upper portion of the combustion chamber 1220.

The handle assembly 1300 includes: (1) a gripping portion 1310; and (2) a trigger mount 1320 defined on the gripping portion 1310. The handle assembly 1300 is suitably connected to the main housing 1100.

The trigger assembly 1400 includes a trigger 1410 suitably connected to the trigger mount 1320 via a trigger pin (not shown) such that part of the trigger 1410 can move relative to the handle assembly 1300.

The fastener magazine assembly 1500 includes: (1) a fastener channel 1510 configured to hold a plurality of fasteners (e.g., nails, or staples) within the fastener channel 1510; and (2) a pair of ribs 1520 that lock into corresponding tooth portions (not shown) of the first wall 1110 and second wall 1120 of the main tool housing 1100. The fastener magazine assembly 1500 is suitably connected to the nosepiece assembly 1700 and to the handle assembly 1300. During operation of the tool 1050, a fastener is delivered, via the fastener channel 1510, to the nosepiece assembly 1700 and driven into the workpiece by the fastener driving assembly 1200.

The workpiece contact assembly 1600 includes a workpiece contact element 1610 suitably connected to the nosepiece assembly 1700 and to the fastener magazine assembly 1500. The workpiece contact element 1610 contacts the location where the fastener is driven into the workpiece by the tool 1050.

The nosepiece assembly 1700 is suitably connected to the fastener magazine assembly 1500 and to the cylinder 1240. The nosepiece assembly 1700 receives a fastener from the fastener channel 1510. During operation of the tool 1050, a piston (not shown) is driven downward in the cylinder 1240, contacts the fastener positioned in the nosepiece assembly 1700 and drives the fastener into the workpiece.

The fuel cell receiving assembly 1800 includes: (1) a fuel cell door 1810 pivotally connected to the housing cap 1130 of the main housing 1100; (2) a fuel cell 1820 at least partially supported by the main housing 1100; (3) a fuel dosing lever 1830 pivotally supported by the cylinder head 1210; (4) a fuel metering valve 1840 suitably connected to the fuel cell 1820; (5) a fuel valve stem 1850 defining a lower portion of the fuel metering valve 1840 and extending into a portion of the fuel cell 1820; (6) a fuel cell receiving block 1860 connected to and in fluid communication with the fuel valve stem 1850; and (7) a fuel line 1870 suitably connected between the fuel cell receiving block 1860 and the combustion chamber 1220. The fuel line 1870 defines a fuel pathway between the fuel cell 1820 and the combustion chamber 1220 to deliver a dose of fuel to the combustion chamber 1220.

FIGS. 4 to 10 illustrate the example fuel dosing lever 1830 of the example fastener driving tool 1050. The illustrated example fuel dosing lever 1830 includes: (1) a dosing lever base 1832; (2) a first dosing lever arm 1834a connected to a first end of the dosing lever base 1832; (3) a second dosing lever arm 1834b connected to a second end of the dosing lever base 1832; (4) a first dosing lever pivot pin 1836a connected to and transversely extending from the first dosing lever arm 1834a; (5) a second dosing lever pivot pin 1836b connected to and transversely extending from the second dosing lever arm 1834b; (6) a first dosing lever engagement end 1838a connected to the first dosing lever arm 1834a; and (7) a second dosing lever engagement end 1838b connected to the second dosing lever arm 1834b.

FIGS. 4 to 9 and 11 illustrate one example cylinder head 1210. The illustrated example cylinder head 1210 includes: (1) a cylinder head body 1212; (2) a first pivot pin receiving member 1214a connected to the cylinder head body 1212 and configured to receive the first dosing lever pivot pin 1836a of the fuel dosing lever 1830; and (3) a second pivot pin receiving member 1214*b* connected to the cylinder head body 1212 and configured to receive the second dosing lever pivot pin 1836*b* of the fuel dosing lever 1830.

In the illustrated example embodiment, the cylinder head 1210 is cast or otherwise fabricated out of a rigid material such as steel, steel alloy, or other such metal or metal alloy. The first pivot pin receiving member 1214*a* and the second pivot pin receiving member 1214*b* are formed in a portion of the cylinder head body 1212. As discussed above, the first pivot pin receiving member 1214*a* is configured to receive and support the first dosing lever pivot pin 1836*a* and the second pivot pin receiving member 1214*b* is configured to receive and support the second dosing lever pivot pin 1836*b*. Accordingly, the first pivot pin receiving member 1214*a* and the second pivot pin receiving member 1214*b* of the cylinder head 1210 define a rigid, inflexible, and stable pivot point 1216 for the fuel dosing lever 1830 of the tool 1050.

In the illustrated example embodiment, the rigid, inflexible and stable pivot point 1216 of the fuel dosing lever 1830 is independent from the fuel cell door 1810. The fuel dosing lever 1830 is supported and held by the rigid, inflexible and stable first and second pivot pin receiving members 1214*a* and 1214*b* of the cylinder head 1210. As such, actuation of the fuel dosing lever 1830 causes the first and second dosing lever pivot pins 1836*a* and 1836*b* to pivot about the pivot point 1216 defined by the first and second pivot pin receiving members 1214*a* and 1214*b* of the cylinder head 1210. Thus, any flexing or other such movement of the fuel cell door 1810 during actuation of the fuel dosing lever 1830 does not influence the transfer of axial forces from the fuel dosing lever 1830 to the fuel cell receiving block 1860. As a result, actuation of the fuel dosing lever 1830 transfers consistent and repeatable forces to the fuel cell receiving block 1860 such that a consistent dose of fuel is dispensed by the fuel cell 1820.

In the illustrated example embodiment, the fuel cell receiving block 1860 (i.e., the fuel cell receiver) is pivotally connected to the cylinder head 1210 by at least one receiving block arm 1860*a*. The fuel cell receiving block 1860 matingly engages with the fuel valve stem 1850. The fuel cell receiving block 1860 includes an internal fuel passageway 1862 aligned with the fuel valve stem 1850 to fluidly couple the fuel valve stem 1850 to the fuel line 1870. As best shown in FIGS. 6 to 9, actuation of the fuel dosing lever 1830 transfers axial forces from the fuel dosing lever 1830 to the fuel cell receiving block 1860. More specifically, actuation of the fuel dosing lever 1830 causes the fuel dosing lever base 1832 to engage with the fuel cell receiving block 1860. This engagement of the fuel cell receiving block 1860 depresses the fuel valve stem 1850 within the fuel metering valve 1840 to dispense the desired dose of fuel from the fuel cell 1820.

Figure 4:
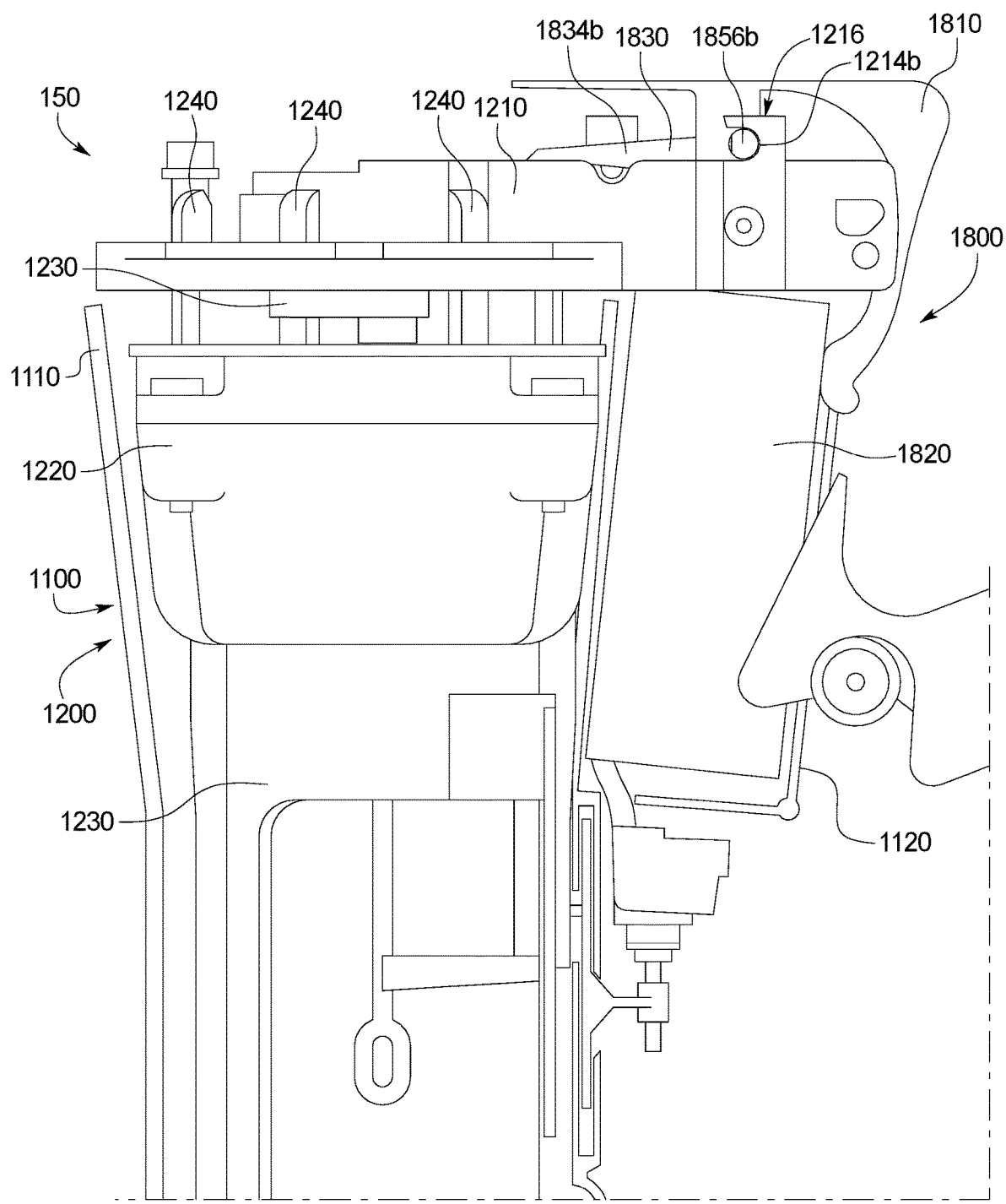
FIG. 4 is an enlarged fragmentary side cross-sectional view of the fastener driving tool of FIG. 3, showing the fuel dosing arm mounted on the cylinder head, and showing the fuel dosing arm in the actuated position.
Figure 5:
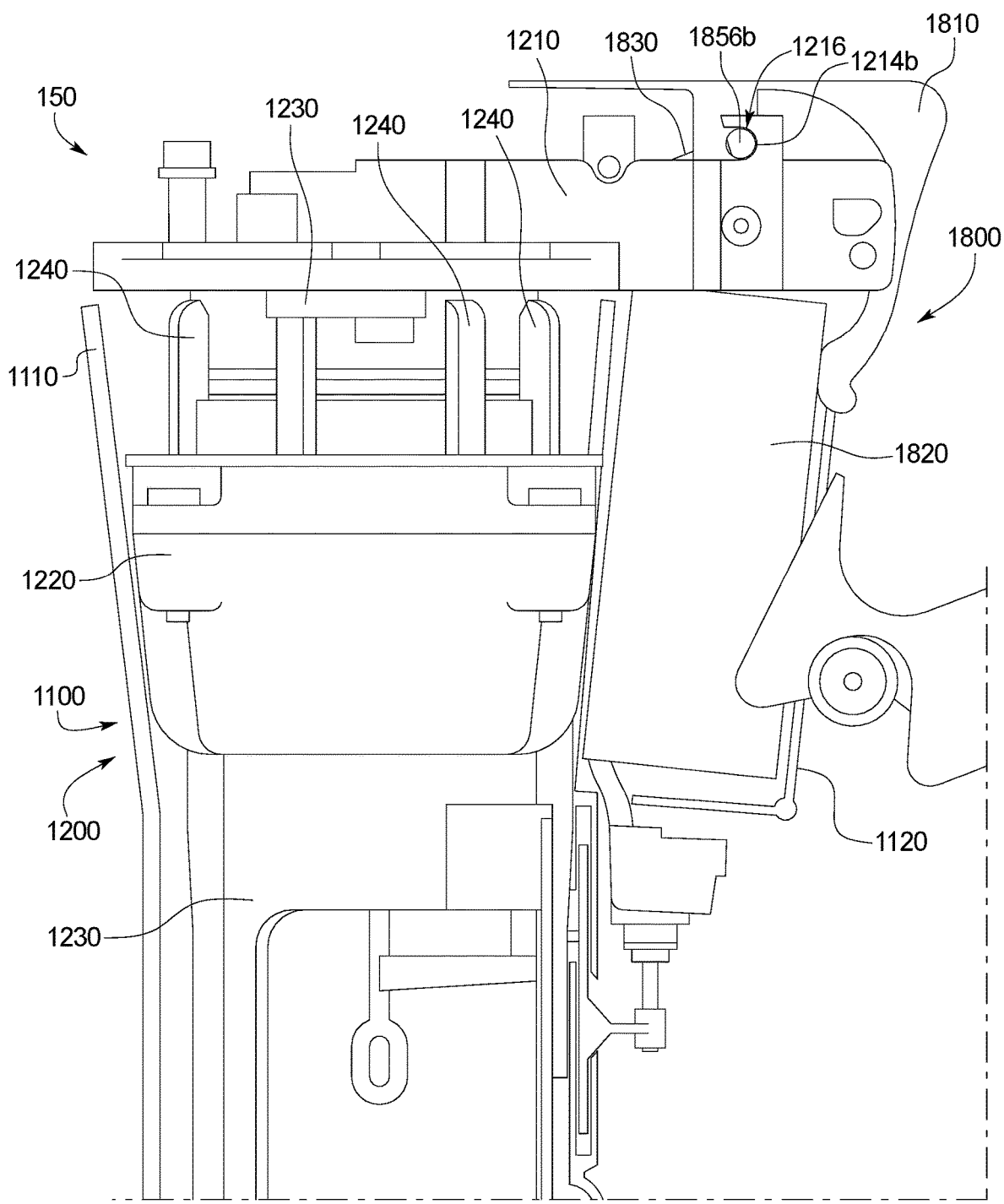
FIG. 5 is an enlarged fragmentary cross-sectional view of the fastener driving tool of FIG. 3, showing the fuel dosing arm mounted on the cylinder head, and showing the fuel dosing arm in the non-actuated position.
Figure 6:
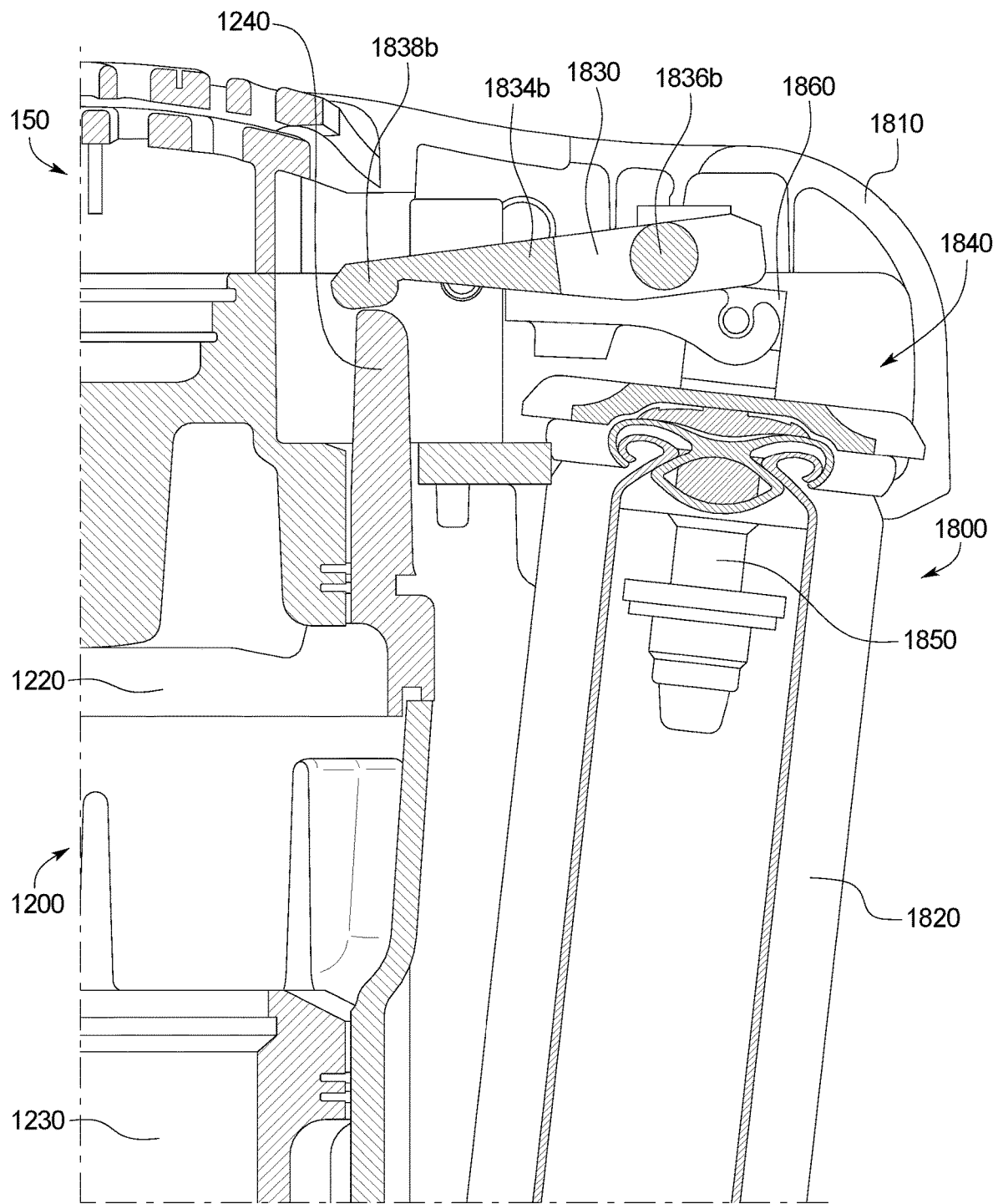
FIG. 6 is an enlarged fragmentary cross-sectional view of the fastener driving tool of FIG. 3, showing the combustion chamber in the closed position, showing the combustion ring finger in the dispensing position, and showing the fuel dosing lever in the actuated position to dispense a dose of fuel.
Figure 7:
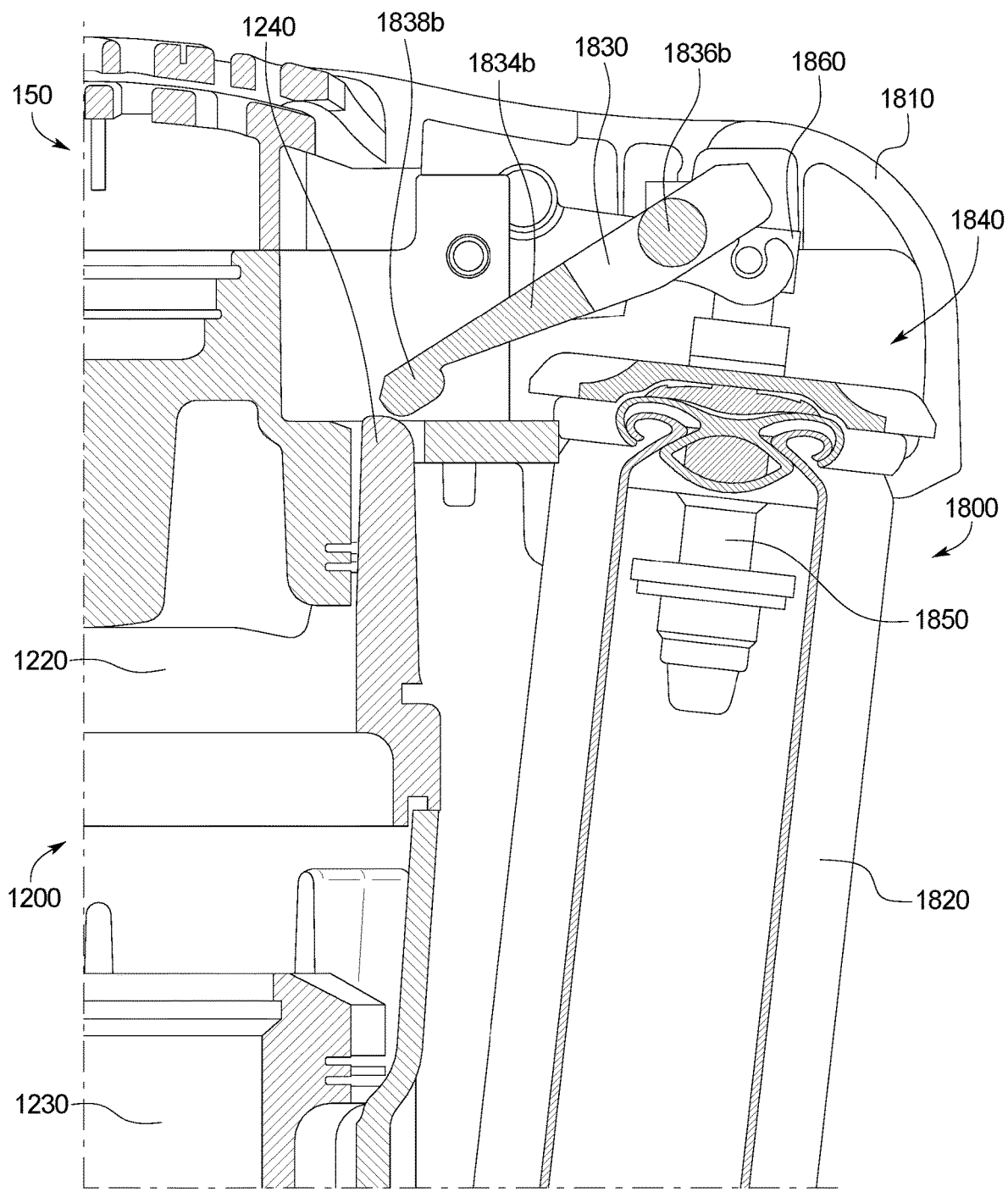
FIG. 7 is an enlarged fragmentary cross-sectional view of the fastener driving tool of FIG. 3, showing the combustion chamber in the open position, showing the combustion ring finger in the non-dispensing position, and showing the fuel dosing lever in the non-actuated position.
Figure 8:
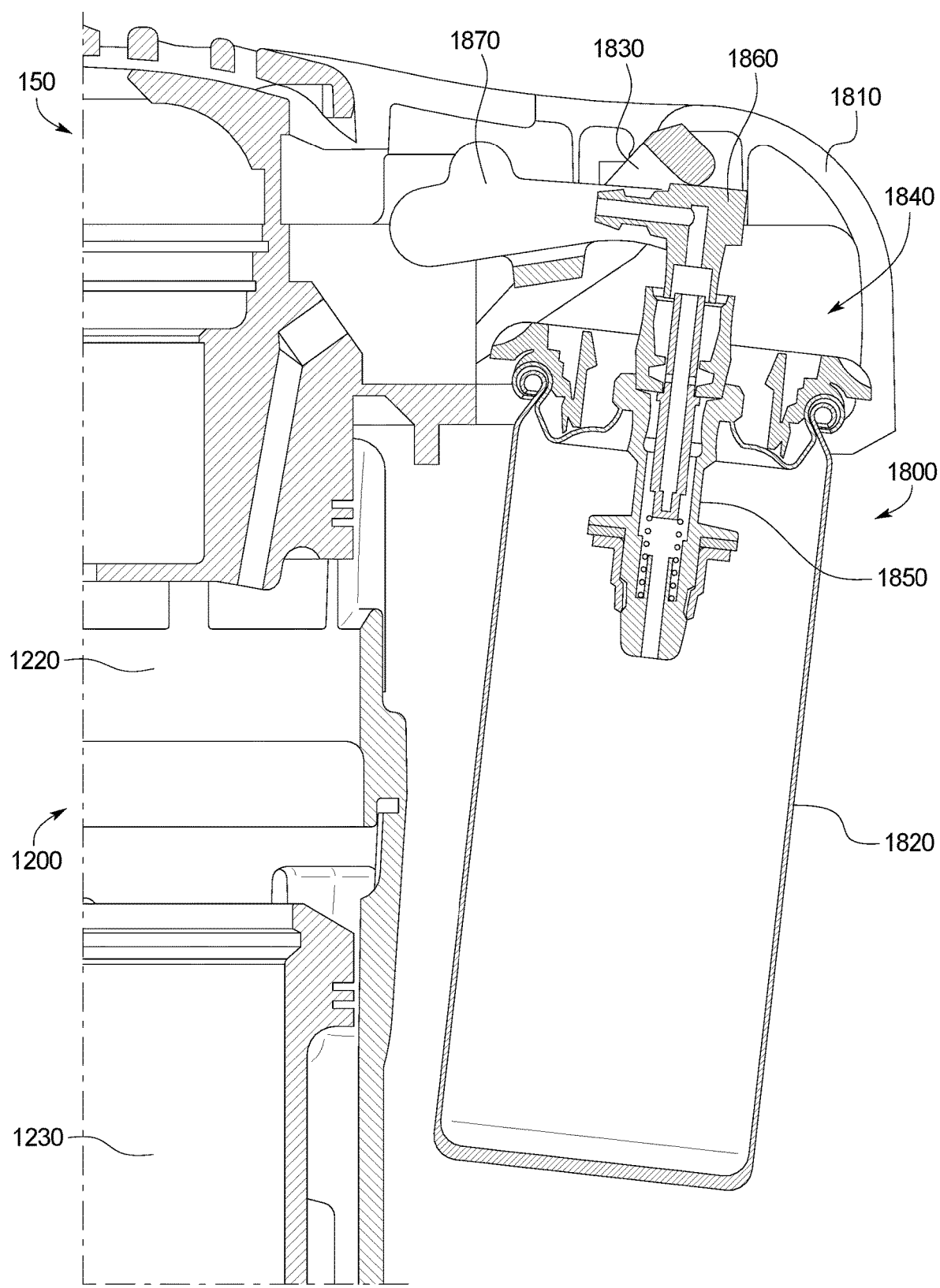
FIG. 8 is an enlarged fragmentary cross-sectional view of the fastener driving tool of FIG. 3, showing the fuel dosing lever in the non-actuated position, and showing the fuel stem receiving block and the fuel valve stem in the non-dispensing position.

Part of the operation of the example fastener driving tool 1050 is also partially shown in FIGS. 3 to 9. In the illustrated example embodiment, the fastener driving tool 1050 is configured to sequentially drive a plurality of fasteners (e.g., nails or staples) into a workpiece. Prior to tool 1050 activation, the combustion chamber 1220 is in an open position and the fuel dosing lever 1830 is in a non-actuated or non-dispensing position. As best shown in FIGS. 5, 7, and 8, when the combustion chamber 1220 is in the open position, the plurality of combustion ring fingers 1250 are in a non-dispensing position with respect to the fuel dosing lever 1830. Additionally, when the combustion chamber 1220 is in the open position the fuel dosing lever 1830 is in the non-actuated or non-dispensing position.

Figure 9:
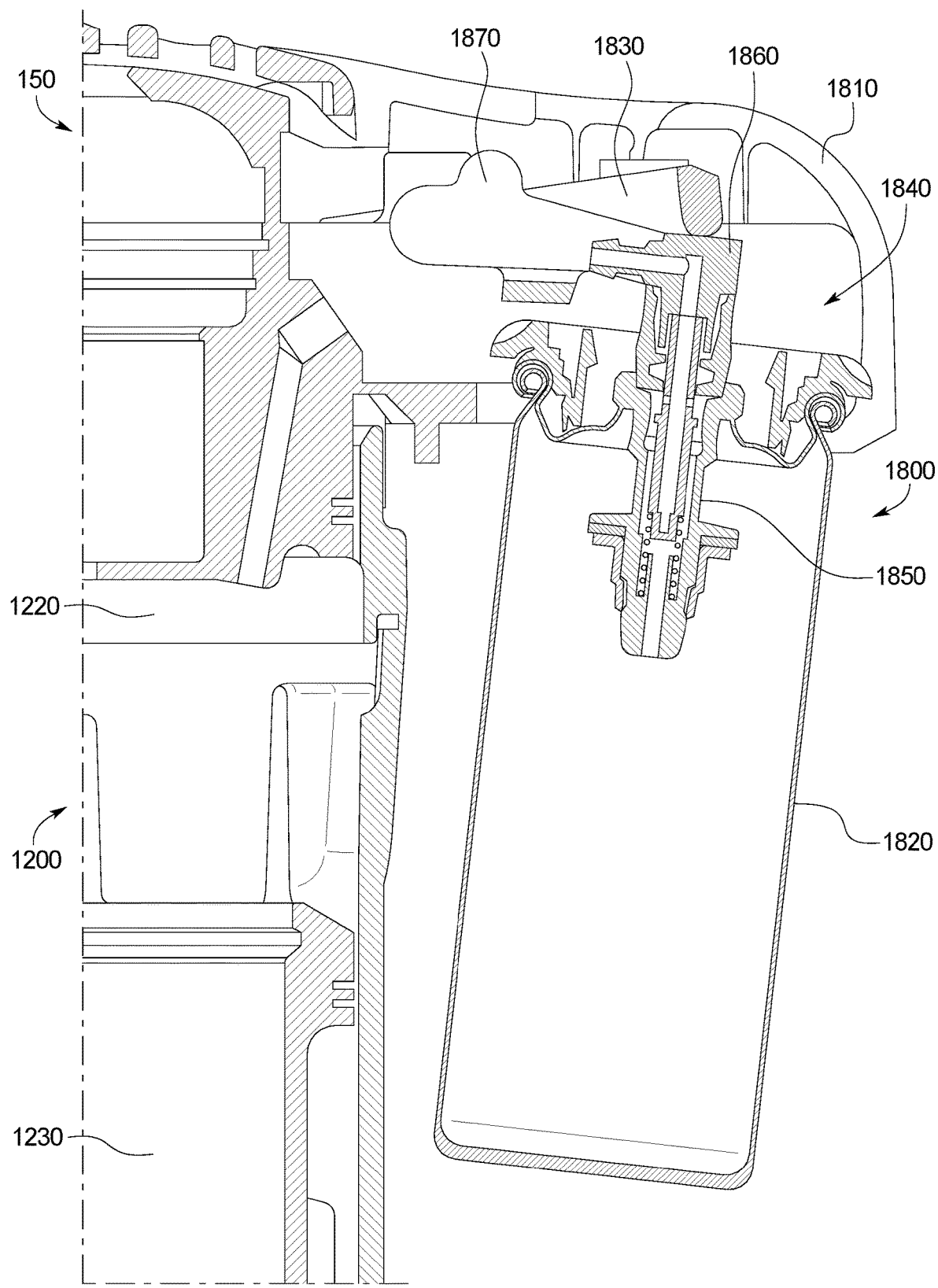
FIG. 9 is an enlarged fragmentary cross-sectional view of the fastener driving tool of FIG. 3, showing the fuel dosing lever in the actuated position, and showing the fuel stem receiving block and the fuel valve stem in the dispensing position.
Figure 10:
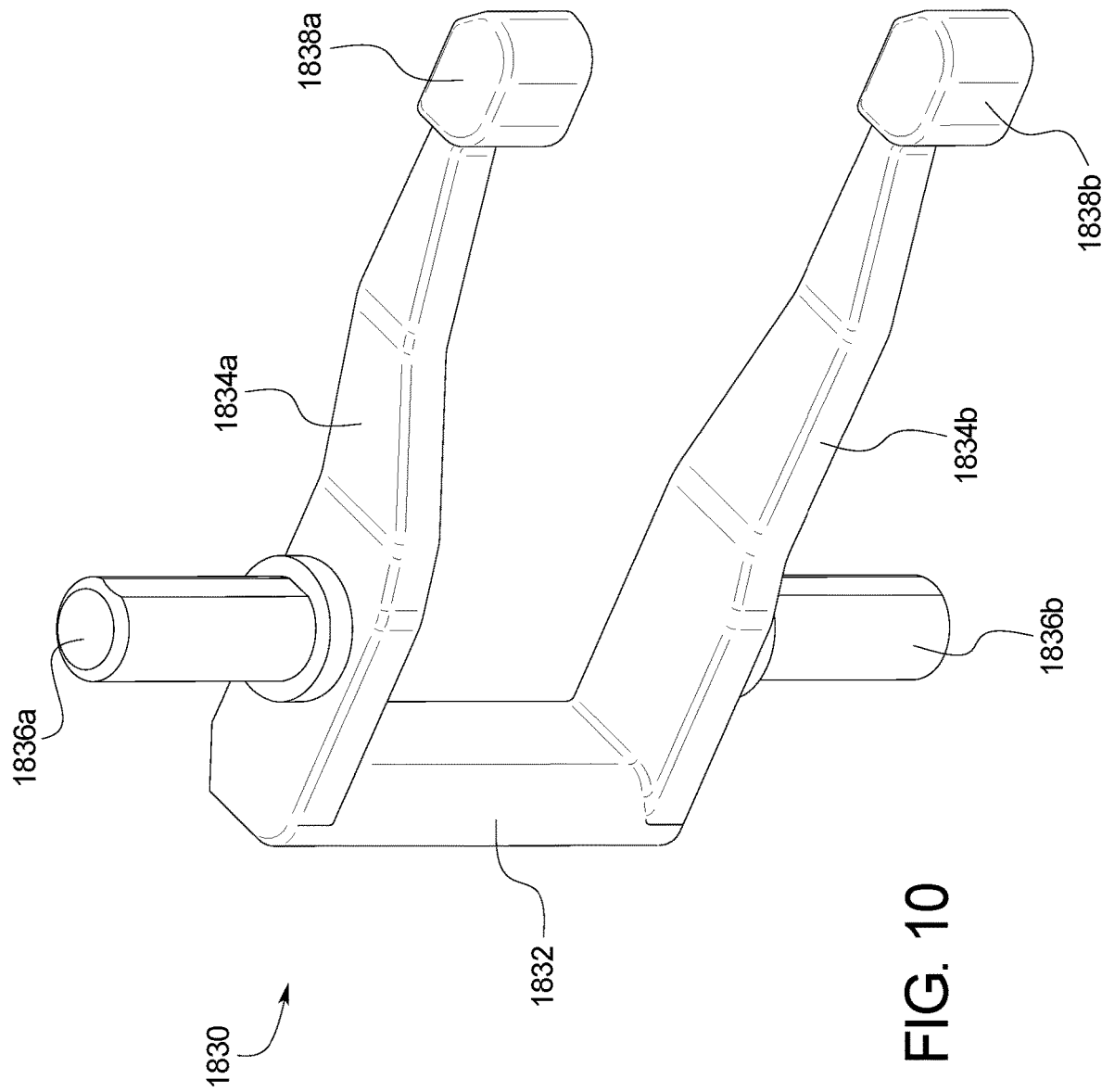
FIG. 10 is a side perspective view of the fuel dosing lever of the fastener driving tool of FIG. 3.
Figure 11:
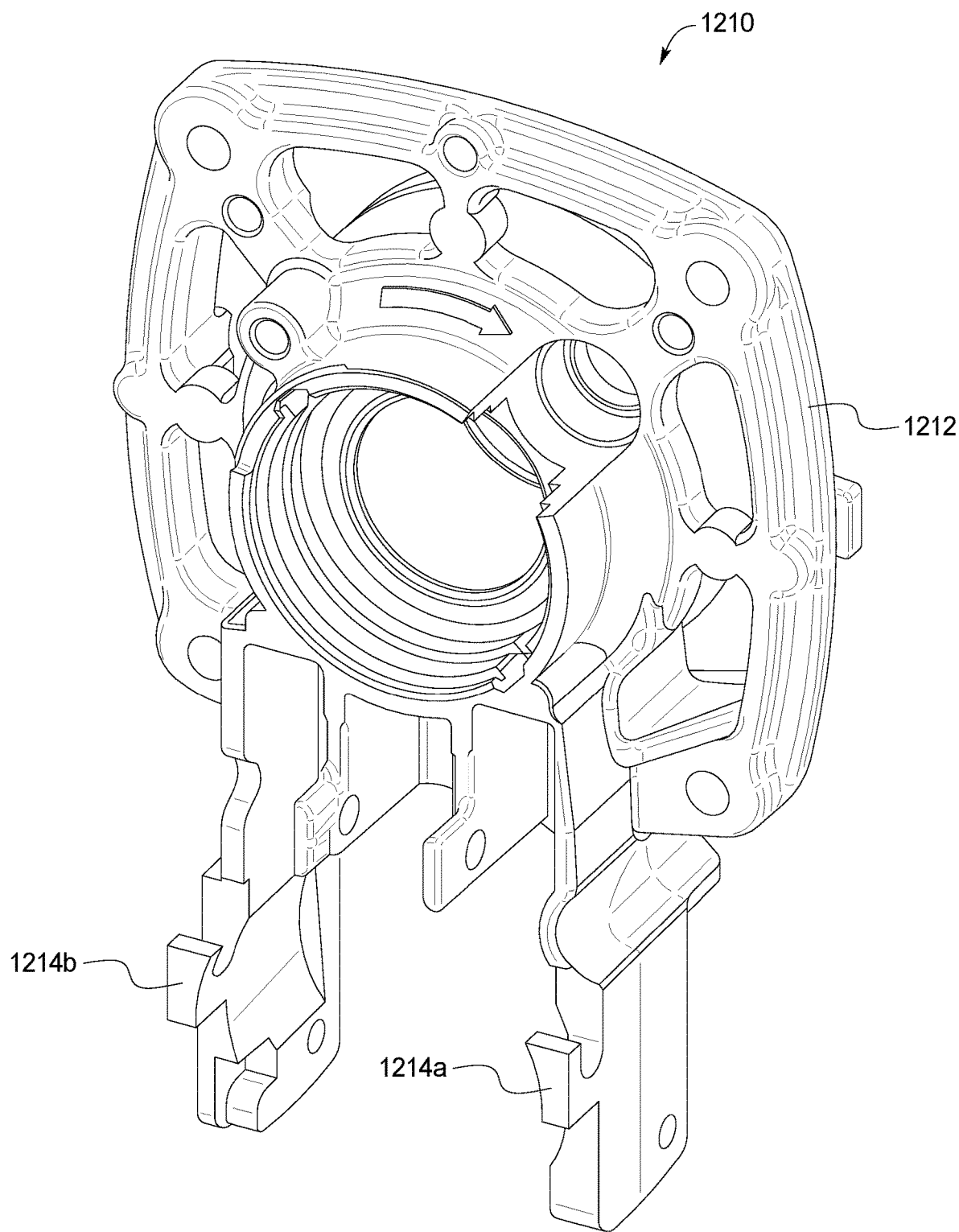
FIG. 11 is top perspective view of the cylinder head of the fastener driving tool of FIG. 3, and showing the pivot pin receiving members of the cylinder head.

When the operator is ready to activate the tool 1050, the operator compresses the workpiece contact element 1610 against the workpiece. This compression of the workpiece contact element 1610 closes the combustion chamber 1220. As best shown in FIGS. 4, 6, and 9, closing the combustion chamber 1220 moves the plurality of combustion ring fingers 1250 in an axially upward direction towards the housing cap 1130 and into a dispensing position with respect to the fuel dosing lever 1830. During this upward movement, the combustion ring fingers 1250 engage with the first and second dosing lever engagement ends 1838*a* and 1838*b* of the fuel dosing lever 1830. As such, the fuel dosing lever 1830 pivots or otherwise moves into the actuated or dispensing position. In this actuated position, the fuel dosing lever 1830 engages with and transfers axial forces to the fuel cell receiving block 1860. The fuel cell receiving block 1860 subsequently depresses the fuel valve stem 1850 to cause the fuel metering valve to dispense the desired dose of fuel from the fuel cell 1820.

In the illustrated example embodiment, engagement between the combustion ring fingers 1250 and the first and second dosing lever engagement ends 1838*a* and 1838*b* pivots the fuel dosing lever 1830 from the non-actuated position into the actuated position. The first and second fuel dosing lever pins 1836*a* and 1836*b* are pivotally engaged with and supported by the first and second pivot pin receiving members 1214*a* and 1214*b* of the cylinder head 1210. As such, the first and second fuel dosing lever pins 1836*a* and 1836*b* of the fuel dosing lever 1830 pivot about the pivot point 1216 of the cylinder head 1210. As discussed above, the first and second pivot pin receiving members 1214*a* and 1214*b* are formed in the cylinder head 1210. The first and second pivot pin receiving members 1214*a* and 1214*b* provide the rigid, inflexible, and stable pivot point 1216 for the fuel dosing lever 1830 of the tool 1050. As such, the fuel dosing lever 1830 pivots about the pivot point 1216 independently from any flexing or other such movement of the fuel cell door 1810.

In the illustrated example embodiment, the actuated fuel dosing lever 1830 pivots about the pivot point 1216 such that the dosing lever base 1832 engages with the fuel cell receiving block 1860. Such engagement between the dosing lever base 1832 and the fuel cell receiving block 1860 transfers axial forces from the fuel dosing lever 1830 to the fuel cell receiving block 1860 to sufficiently dispense a dose of fuel from the fuel metering valve 1840.

As best seen in FIGS. 8 and 9, actuation of the fuel dosing lever 1830 causes a subsequent engagement between the fuel cell receiving block 1860 and the fuel valve stem 1850 of the fuel metering valve 1840. Engagement between the fuel dosing lever 1830 and the fuel cell receiving block 1860 depresses the fuel cell receiving block 1860 into a portion of the fuel metering valve 1840 such that the fuel cell receiving block 1860 contacts the fuel valve stem 1850. The fuel metering valve 1840 then draws the desired dose of fuel from the fuel cell 1820 through the fuel valve stem 1850 and into the fuel cell receiving block 1860. This dose of fuel is then transported through the internal fuel passageway 1862 of the fuel cell receiving block 1860, through the fuel line 1870, and into the combustion chamber 1220 of the tool 1050.

During actuation of the fuel dosing lever 1830, the first pivot pin receiving member 1214*a* and the second pivot pin receiving member 1214*b* of the cylinder head 1210 provide rigid support to the first dosing lever pivot pin 1836*a* and the second dosing lever pivot pin 1836*b* of the fuel dosing lever 1830. Such rigid support enables each actuation cycle of the fuel dosing lever 1830 to provide stable, repeatable, and consistent forces to the fuel cell receiving block 1860. As a result, the fuel cell 1820 delivers a consistent dose of fuel to the combustion chamber 1220 during each fuel dosing lever 1830 actuation cycle.

Once the dose of fuel is delivered to the combustion chamber 1220, activation of the trigger 1410 sparks or otherwise ignites the delivered dose of fuel in the combustion chamber 1220. This fuel ignition generates combustion energy that is directed downward within the combustion chamber 1220 and into the cylinder 1240. The combustion energy acts on a piston (not shown) within the cylinder 1240 to drive the piston downward through the cylinder 1240. The piston contacts a fastener (not shown) positioned in the nosepiece assembly 1700 and drives the fastener into the workpiece.

FIGS. 12 to 17 illustrate selected components of another example embodiment of the combustion powered fastener driving tool of the present disclosure which is generally indicated by numeral 2050 (and sometimes referred to herein as the "tool" for brevity). Tool 2050 is similar to tool 1050 discussed above. Other components of the tool 2050 not discussed herein will be readily understood by those skilled in the art.

Figure 12:
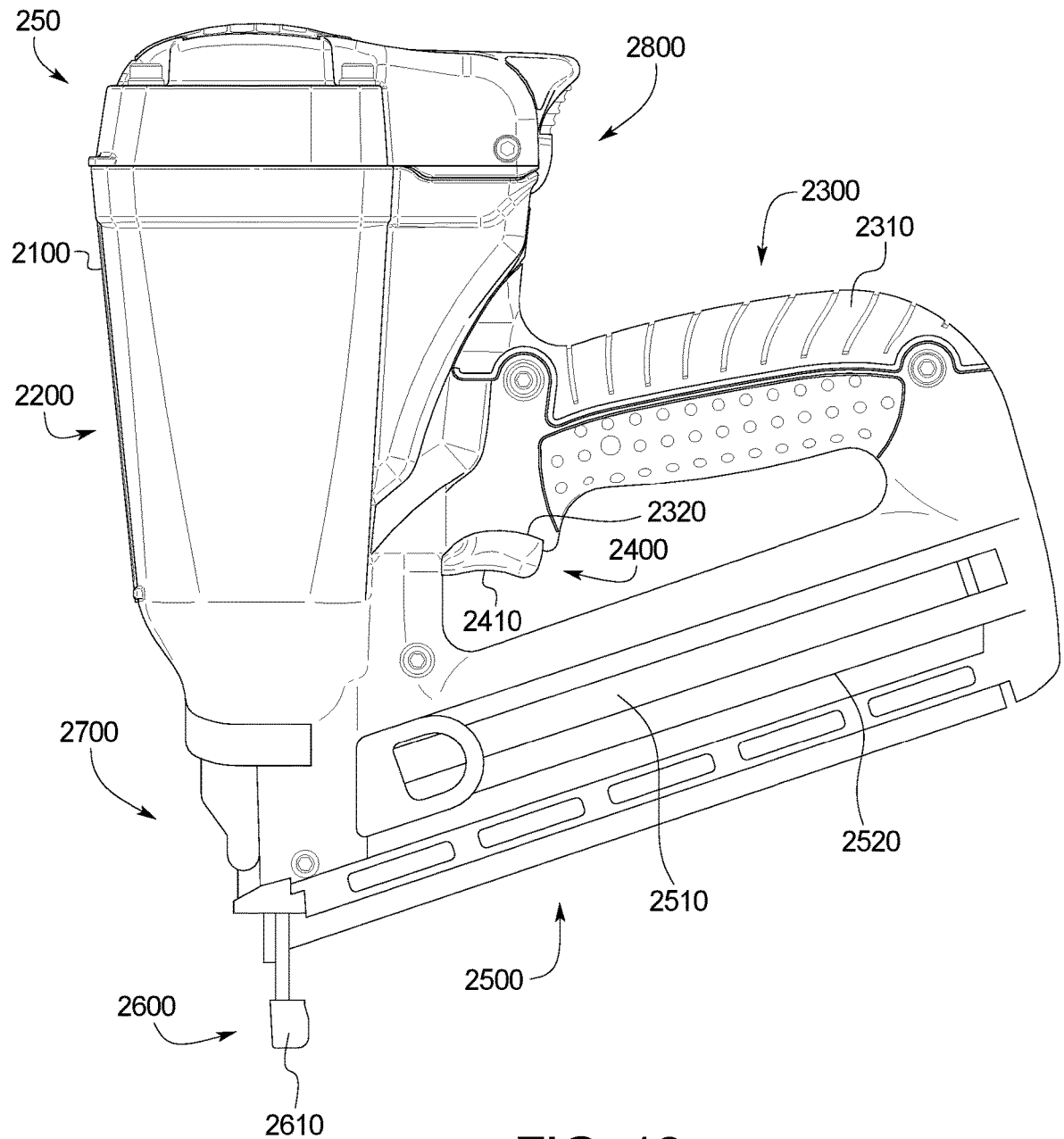
FIG. 12 is a side perspective view of another example embodiment of a fastener driving tool of the present disclosure.

As best shown in FIG. 12, the illustrated example fastener driving tool 2050 includes: (1) a main housing 2100; (2) a fastener driving assembly 2200 at least partially positioned in, supported by and connected to the main housing 2100; (3) a handle assembly 2300 supported by and connected to the main housing 2100; (4) a trigger assembly 2400 supported by and connected to the main housing 2100 and the handle assembly 2300; (5) a fastener magazine assembly 2500 supported by and connected to the main housing 2100 and the handle assembly 2300; (6) a workpiece contact assembly 2600 supported by and connected to the main housing 2100; (7) a nosepiece assembly 2700 supported by and connected to a lower portion of the main housing 2100; and (8) a fuel cell receiving assembly 2800 partially positioned in, supported by, and connected to the main housing 2100.

The main housing 2100 includes: (1) a first wall (not shown); (2) a second wall (not shown) opposite of the first wall; and (3) a housing cap 2130 suitably connected to the first and second walls. Thus, the main housing 2100 provides a suitable protective enclosure for the fastener driving assembly 2200, the fuel cell receiving assembly 2800, and other components of the tool 2050.

The fastener driving assembly 2200 includes: (1) a cylinder head 2210; (2) a combustion chamber (not shown) suitably connected to the cylinder head 2210; (4) a fan motor (not shown) suitably mounted to the cylinder head 2210 and projecting into the combustion chamber; (3) a cylinder (not shown) suitably connected to the combustion chamber; and (4) a plurality of combustion ring fingers (not shown) suitably connected to an upper portion of the combustion chamber.

The handle assembly 2300 includes: (1) a gripping portion 2310; and (2) a trigger mount 2320 defined on the gripping portion 2310. The handle assembly 2300 is suitably connected to the main housing 2100.

The trigger assembly 2400 includes a trigger 2410 suitably connected to the trigger mount 2310 via a trigger pin (not shown) such that part of the trigger 2410 can move relative to the handle assembly 2300.

The fastener magazine assembly 2500 includes: (1) a fastener channel 2510 configured to hold a plurality of fasteners (e.g., nails or staples) within the fastener channel 2510; and (2) a pair of ribs 2520 that lock into corresponding tooth portions (not shown) of the first wall and second wall of the main tool housing 2100. The fastener magazine assembly 2500 is suitably connected to the nosepiece assembly 2700 and to the handle assembly 2300. During operation of the tool 2050, a fastener is delivered, via the fastener channel 2510, to the nosepiece assembly 2700 and driven into the workpiece by the fastener driving assembly 2200.

The workpiece contact assembly 2600 includes a workpiece contact element 2610 suitably connected to the nosepiece assembly 2700 and to the fastener magazine assembly 2500. The workpiece contact element 2610 contacts the location where the fastener is driven into the workpiece by the tool 2050.

The nosepiece assembly 2700 is suitably connected to the fastener magazine assembly 2500 and to the cylinder. The nosepiece assembly 2700 receives a fastener from the fastener channel 2510. During operation of the tool 2050, a piston (not shown) is driven downward in the cylinder, contacts the fastener positioned in the nosepiece assembly 2700, and drives the fastener into the workpiece.

The fuel cell receiving assembly 2800 includes: (1) a fuel cell door 2810 pivotally connected to the housing cap 2130 of the main housing 2100; (2) a fuel cell 2820 at least partially supported by the main housing 2100; (3) a fuel dosing lever 2830 pivotally supported by the housing cap 2130; (4) a fuel metering valve 2840 suitably connected to the fuel cell 2820; (5) a fuel valve stem (not shown) defining a lower portion of the fuel metering valve 2840 and extending into a portion of the fuel cell 2820; (6) a fuel cell receiving block 2860 connected to and in fluid communication with the fuel valve stem; and (7) a fuel line (not shown) suitably connected between the fuel cell receiving block 2860 the combustion chamber. The fuel line defines a fuel pathway between the fuel cell 2820 and the combustion chamber to deliver a dose of fuel from the fuel cell to the combustion chamber.

FIGS. 12 to 15, and 17 illustrate the example fuel dosing lever 2830 of the fastener driving tool 2050. The illustrated example fuel dosing lever 2830 includes: (1) a dosing lever base 2832; (2) a first dosing lever arm 2834a connected to a first end of the dosing lever base 2832; (3) a second dosing lever arm 2834b connected to a second end of the dosing lever base 2832; (4) a first dosing lever pivot pin 2836a connected to and transversely extending from the first dosing lever arm 2834a; (5) a second dosing lever pivot pin 2836b connected to and transversely extending from the second dosing lever arm 2834b; (6) a first dosing lever engagement end 2838a connected to the first dosing lever arm 2834a; (7) a second dosing lever engagement end 2838b connected to the second dosing lever arm 2834b; (8) a first lever fastening member 2839a connected to and transversely extending from the first dosing lever arm 2834a; and (9) a second lever fastening member 2839b connected to and transversely extending from the second dosing lever arm 2834b.

Figure 17:
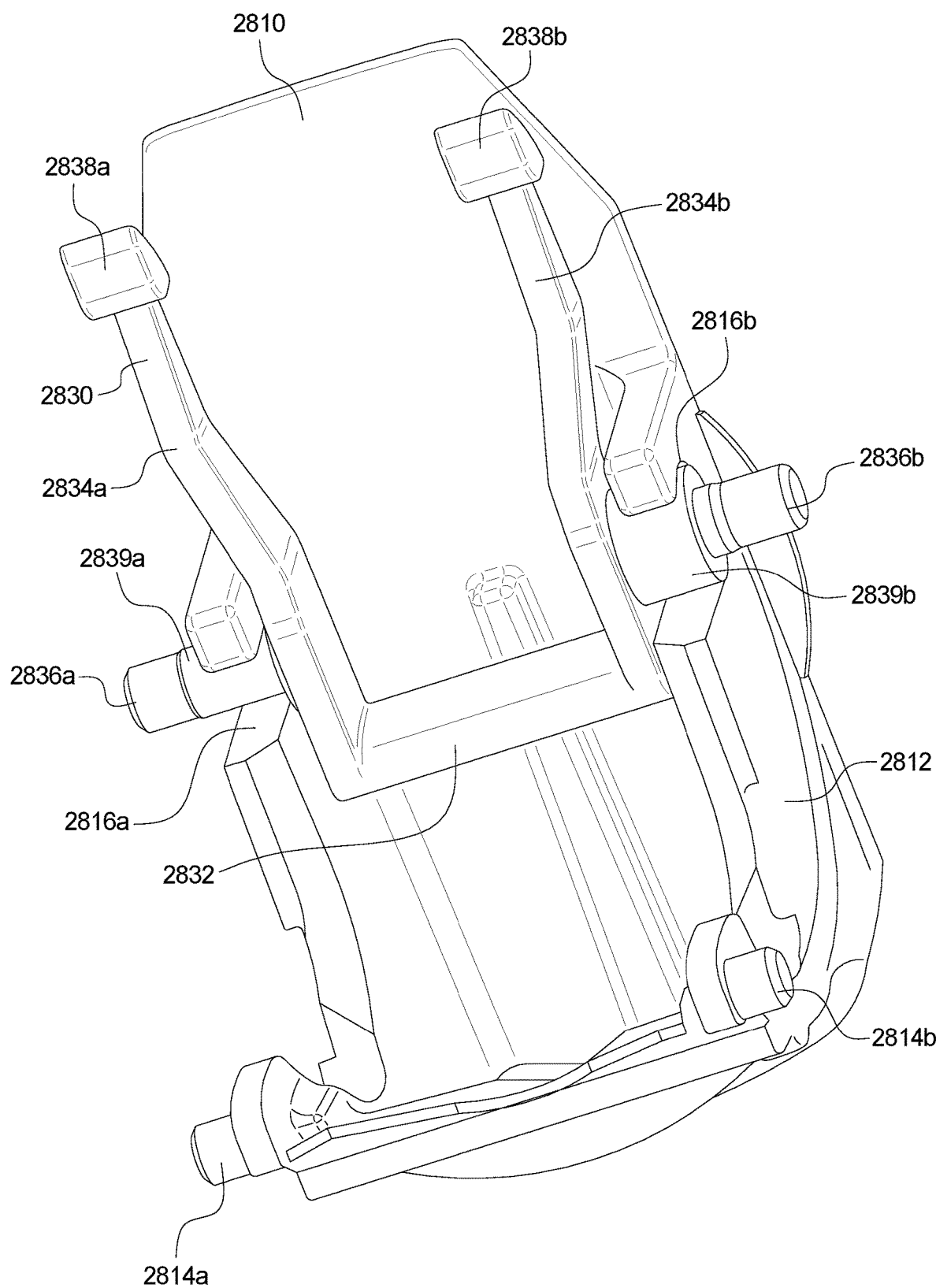
FIG. 17 is an enlarged bottom perspective view of the fuel door and fuel dosing lever of the fastener driving tool of FIG. 12, and showing first and second door fastening members of the fuel door attached to first and second lever fastening members of the fuel dosing lever.

As best seen in FIG. 17, the first lever fastening member 2839a is axially aligned with and axially interior to the first dosing lever pivot pin 2836a of the fuel dosing lever 2830. The first lever fastening member 2839a includes a cylindrical shape with an outer diameter that is larger than an outer diameter of the first dosing lever pivot pin 2836a. The second lever fastening member 2839b is axially aligned with and axially interior to the second dosing lever pivot pin 2836b of the fuel dosing lever 2830. The second lever fastening member 2839b includes a cylindrical shape with an outer diameter that is larger than an outer diameter of the second dosing lever pivot pin 2836b. In certain examples, the outer diameter of the second lever fastening member 2839b is larger than the outer diameter of the first door fastening member 2939a. However, it will be understood that other dimensions of the first and second lever fastening members 2839a and 2839b are possible.

Figure 13:
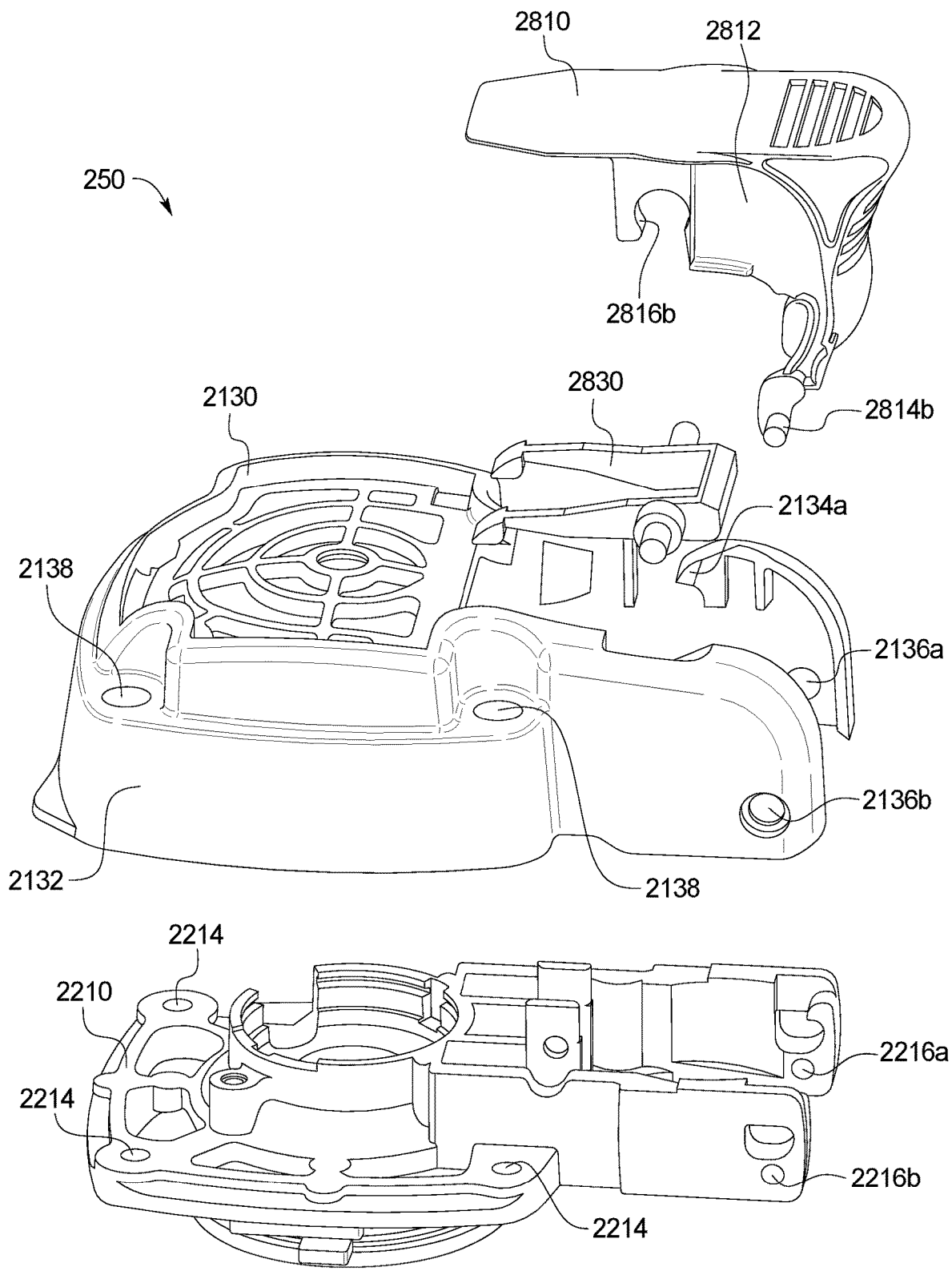
FIG. 13 is an exploded perspective view showing the fuel door, the fuel dosing lever, the housing cap and the cylinder head of the fastener driving tool of FIG. 12.

FIGS. 13 and 17 illustrate the example fuel door 2810 of the tool 2050. The illustrated example fuel door 2810 includes: (1) a fuel door body 2812; (2) a first door pin 2814a transversely extending from the fuel door body 2812; (3) a second door pin 2814b transversely extending from the fuel door body 2812; (4) a first door fastening member 2816a formed in the fuel door body 2812; and (5) a second door fastening member 2816b formed in the fuel door body 2812.

As best seen in FIG. 17, the first and second door fastening members 2816a and 2816b of the fuel door 2810 are configured to mate with the first and second lever fastening members 2839a and 2839b of the fuel dosing lever 2830. In the illustrated example, the first door fastening member 2816a has a diameter that is slightly smaller than the outer diameter of the first lever fastening member 2839a. In the illustrated example, the second door fastening member 2816b has a diameter that is slightly smaller than the outer diameter of the second lever fastening member 2839b. As such, when the fuel door 2810 is moved into the closed position, the first and second door fastening members 2816a and 2816b snap or otherwise securely fasten around the first and second lever fastening members 2839a and 2839b to suitably fasten the fuel door 2810 to the fuel dosing lever 2830. When the fuel door 2810 is moved into the open position, the first and second door fastening members 2816a and 2816b unsnap or otherwise unfasten from the first and second lever fastening members 2839a and 2839b to unfasten the fuel door 2810 from the fuel dosing lever 2830.

In the illustrated example embodiment, these different diameters of the first and second lever fastening members 2839a and 2839b and the first and second door fastening members 2816a and 2816b help prevent assembly errors of the fuel dosing lever 2830 in the tool 2050. That is, if the fuel dosing lever 2830 is not properly installed in the tool 2050, the fuel door 2810 will not properly close. For example, if not properly installed the first door fastening member 2816a of the fuel door 2810 will not snap or otherwise suitably fasten around the second lever fastening member 2839b of the fuel dosing lever 2830. Also, if not properly installed the second door fastening member 2816b of the fuel door 2810 will not snap or otherwise suitably fasten around the first lever fastening member 2839a of the fuel dosing lever 2830.

As best seen in FIGS. 12 to 16, the illustrated example housing cap 2130 includes: (1) a housing cap body 2132; (2) a first pivot pin receiving member 2134a connected to the housing cap body 2132; (3) a second pivot pin receiving member 2134b connected to the housing cap body 2132; (4) a first door attachment aperture 2136a; (5) a second door attachment aperture 2136b; (6) a plurality of fastener apertures 2138 defined in and extending through the housing cap body 2132; (7) a first pivot pin pathway 2140a defined in the housing cap body 2132 and positioned adjacent to the first pivot pin receiving member 2134a; and (8) a second pivot pin pathway 2140b defined in the housing cap body 2132 and positioned adjacent to the second pivot pin receiving member 2134b.

In the illustrated example embodiment, the housing cap 2130 is molded or otherwise fabricated out of a rigid material such as hard plastic, or other such moldable material. The first pivot pin receiving member 2134a and the second pivot pin receiving member 2134b are connected to and supported by the housing cap body 2132. As such, the first pivot pin receiving member 2134a is configured to receive and support the first dosing lever pivot pin 2836a of the fuel dosing lever 2830 and the second pivot pin receiving member 2134b is configured to receive and support the second dosing lever pivot pin 2836b of the fuel dosing lever 2830. Accordingly, the first pivot pin receiving member 2134a and the second pivot pin receiving member 2134b of the housing cap 2130 define a rigid, inflexible, and stable pivot point 2139 for the fuel dosing lever 2830 of the tool 2050.

In the illustrated example embodiment, during fabrication of the housing cap 2130 the first and second pivot pin receiving members 2134a and 2134b are molded or otherwise formed in the housing cap body 2132. As such, fabrication of the housing cap 2130 forms a monolithic structure including the first and second pivot pin receiving members 2134a and 2143b and other such moldable features and components of the housing cap 2130. However, it will be understood that the first and second pivot pin receiving members 2134a and 2134b may alternatively be formed as separate components that are suitably fastened to the housing cap body 2132 during fabrication of the housing cap 2130.

In the illustrated example embodiment, the rigid, inflexible and stable pivot point 2139 of the housing cap 2130 is independent from the fuel cell door 2810 and the cylinder head 2210. As such, the fuel dosing lever 2830 is supported and held by the rigid, inflexible, and stable first and second pivot pin receiving members 2134a and 2134b of the housing cap 2130. Actuation of the fuel dosing lever 2830 causes the first and second dosing lever pivot pins 2836a and 2836b to pivot about the pivot point 2139 defined by the first and second pivot pin receiving members 2134a and 2134b. Thus, during actuation of the fuel dosing lever 2830 any flexibility or movement of the fuel cell door 2810 does not influence the transfer of axial forces from the fuel dosing lever 2830 to the fuel cell receiving block 2860. As a result, actuation of the fuel dosing lever 2830 transfers consistent forces to the fuel cell receiving block 2860 such that a consistent dose of fuel is dispensed by the fuel cell 2820.

In the illustrated example embodiment, during fabrication of the housing cap 2130 the first and second pivot pin pathways 2140a and 2140b are molded or otherwise defined in a portion of the housing cap body 2132. The first pivot pin pathway 2140a is adjacent to the first pivot pin receiving member 2134a and the second pivot pin pathway 2140b is adjacent to the second pivot pin receiving member 2134b. As such, the first and second pivot pin pathways 2140a and 2140b are configured to define an open pathway for the insertion and/or removal of the fuel dosing lever 2830 from the first and second pivot pin receiving members 2134a and 2134b, respectively.

In the illustrated example embodiment, the first and second pivot pin pathways 2140a and 2140b aid in the removal and/or insertion of the fuel cell 2820 of the fuel cell receiving assembly 2800. For example, the fuel dosing lever 2830 may be removed from the housing cap 2130 by guiding the first and second dosing lever pivot pins 2836a and 2836b through the first and second pivot pin pathways 2140a and 2140b. The fuel cell 2820 may then be removed from the fuel cell receiving assembly 2800. A replacement fuel cell 2820 may then be inserted into the fuel cell receiving assembly 2800. Once the replacement fuel cell 2820 is inserted, the fuel dosing lever 2830 may be re-inserted into the housing cap 2130 by guiding the first and second dosing lever pivot pins 2836a and 2836b through the first and second pivot pin pathways 2140a and 2140b and seating the first and second dosing lever pivot pins 2836a and 2836b in the first and second pivot pin receiving members 2134a and 2134b.

Figure 14:
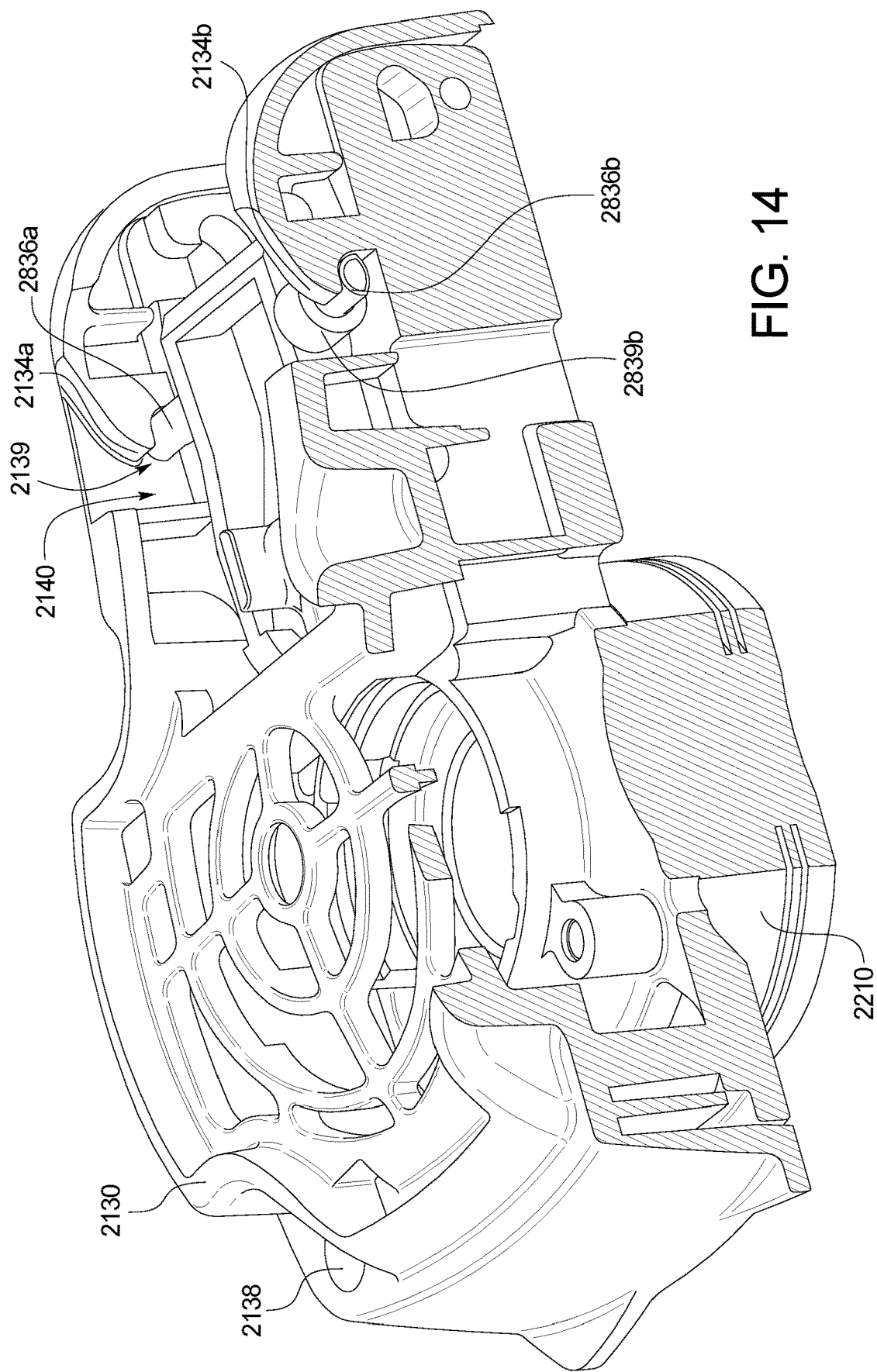
FIG. 14 is an enlarged perspective cross-sectional view of the housing cap covering the cylinder head of the fastener driving tool of FIG. 12, and showing and the fuel dosing lever mounted on the housing cap.
Figure 15:
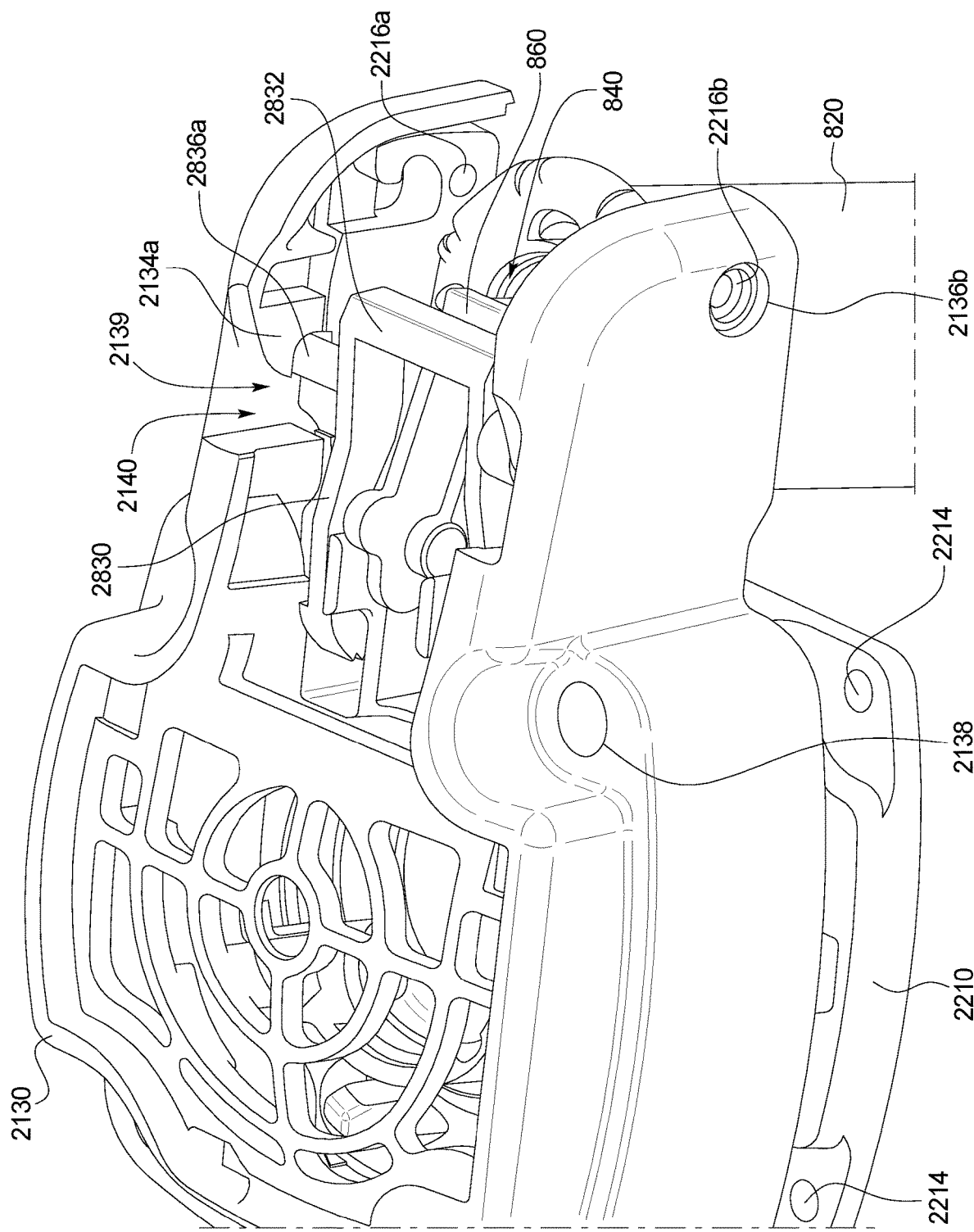
FIG. 15 is an enlarged fragmentary top perspective view of the housing cap covering the cylinder head of the fastener driving tool of FIG. 12, showing the fuel dosing lever mounted on the housing cap, and showing the fuel dosing lever in the actuated position.
Figure 16:
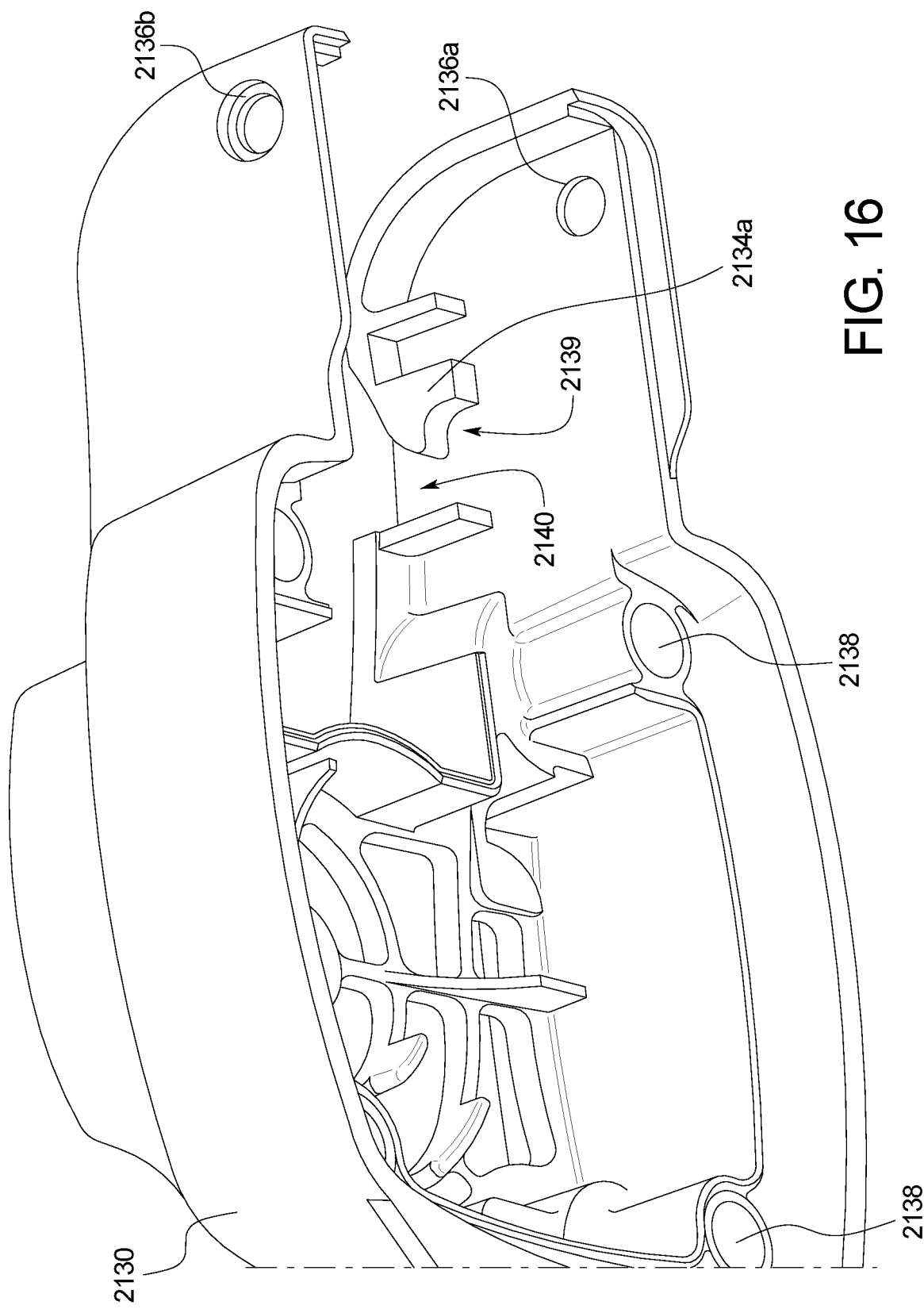
FIG. 16 is an enlarged fragmentary bottom perspective view of the housing cap of the fastener driving tool of FIG. 12, showing a pivot pin receiving member connected to the housing cap body, and showing a pivot pin receiving pathway defined in the housing cap body.

FIGS. 13 to 15 illustrate one example cylinder head 2210. The illustrated example cylinder head 2210 includes: (1) a cylinder head body 2212 that is cast or otherwise fabricated out of a rigid material such as steel, steel alloy, or other such metal or metal alloy; (2) a plurality of fastener apertures 2214 defined in the cylinder head body 2212; (3) a first door attachment aperture 2216a defined in the cylinder head body 2212; and (4) a second door attachment aperture 2216b defined in the cylinder head body 2212.

In the illustrated example embodiment, the plurality of fastener apertures 2214 are threaded and configured to receive a plurality of threaded fasteners (not shown). As such, the housing cap 2130 is suitably fastened to the cylinder head 2210 via the fasteners inserted through the fastener apertures 2138 of the housing cap 2130 and threaded into fastener apertures 2214 of the cylinder head 2210.

In the illustrated example embodiment, the first door attachment aperture 2216a of the cylinder head 2210 aligns with the first door attachment aperture 2136a of the housing cap 2130 and the second door attachment aperture 2216b of the cylinder head 2210 aligns with the second door attachment aperture 2136b of the housing cap 2130. As such, the first door pin 2814a of the fuel door 2810 extends through the aligned first door attachment aperture 2216a of the cylinder head 2210 and the first door attachment aperture 2136a of the housing cap 2130, and the second door pin 2814b of the fuel door 2810 extends through the aligned second door attachment aperture 2216b of the cylinder head 2210 and the second door attachment aperture 2136b of the housing cap 2130. As such, the fuel door 2810 is pivotally connected, via the first and second door pins 2814a and 2814b, to the cylinder head 2210 and the housing cap 2130.

In the illustrated example embodiment, the fuel cell receiving block 2860 (i.e., the fuel cell receiver) is pivotally connected to the cylinder head 2210 by at least one receiving block arm (not shown). The fuel cell receiving block 2860 matingly engages with the fuel valve stem (not shown) of the fuel metering vale 2840. The fuel cell receiving block 2860 includes an internal fuel passageway aligned with the fuel valve stem that fluidly couples the fuel valve stem to the fuel line. Actuation of the fuel dosing lever 2830 transfers axial forces from the fuel dosing lever 2830 to the fuel cell receiving block 2860. More specifically, actuation of the fuel dosing lever 2830 causes the fuel dosing lever base 2832 to engage with the fuel cell receiving block 2860. This engagement of the fuel cell receiving block 2860 depresses the fuel valve stem within the fuel metering valve 2840 to dispense the desired dose of fuel from the fuel cell 2820.

Operation of the fastener driving tool 2050 is similar to the operation of tool 1050, as discussed above. The tool 2050 is configured to drive a plurality of fasteners (e.g., nails or staples) into a workpiece. Prior to tool 2050 activation, the combustion chamber is in an open position and the fuel dosing lever 2830 is in a non-actuated position. When the combustion chamber is in the open position the plurality of combustion ring fingers are in a non-dispensing position with respect to the fuel dosing lever 2830. As such, the fuel dosing lever 2830 is in the non-actuated position.

When the operator is ready to activate the tool 2050, the operator compresses the workpiece contact element 2610 against the workpiece. This compression of the workpiece contact element 2610 causes the combustion chamber to close. Closing the combustion chamber moves the plurality of combustion ring fingers in an axially upward direction towards the housing cap 2130 and into a dispensing position. During this upward movement, the combustion ring fingers engage with the first and second dosing lever engagement ends 2838a and 2838b of the fuel dosing lever 2830. As such, the fuel dosing lever 2830 pivots or otherwise moves into the actuated or dispensing position. In this actuated position, the fuel dosing lever 2830 engages with and transfers axial forces to the fuel cell receiving block 2860. The fuel cell receiving block 2860 subsequently depresses the fuel valve stem of the fuel metering valve 2840 to dispense the desired dose of fuel from the fuel cell 2820.

Engagement between the combustion ring fingers and the first and second dosing lever engagement ends 2838a and 2838b pivots the fuel dosing lever 2830 from the non-actuated position into the actuated position. The first and second fuel dosing lever pins 2836a and 2836b are pivotally engaged with and supported by the first and second pivot pin receiving members 2134a and 2134b of the housing cap 2130. As such, the first and second fuel dosing lever pins 2836a and 2836b of the fuel dosing lever 2830 pivot about the pivot point 2139 of the housing cap 2130. As discussed above, the first and second pivot pin receiving members 2134a and 2134b are connected to and supported by the housing cap body 2132. The first and second pivot pin receiving members 2134a and 2134b provide the rigid, inflexible, and stable pivot point 2139 for the fuel dosing lever 2830 of the tool 2050. As such, the fuel dosing lever 2830 pivots about the pivot point 2139 independently from any flexing or other such movement of the fuel cell door 2810.

The actuated fuel dosing lever 2830 pivots about the pivot point 2139 such that the dosing lever base 2832 engages with the fuel cell receiving block 2860. Such engagement between the dosing lever base 2832 and the fuel cell receiving block 2860 transfers axial forces from the fuel dosing lever 2830 to the fuel receiving block 2860 to dispense a dose of fuel from the fuel metering valve 2840.

Actuation of the fuel dosing lever 2830 causes a subsequent engagement between the fuel cell receiving block 2860 and the fuel valve stem of the fuel metering valve 2840. Engagement between the fuel dosing lever 2830 and the fuel cell receiving block 2860 depresses the fuel receiving block 2860 into a portion of the fuel metering valve 2840 such that the fuel receiving block 2860 contacts the fuel valve stem. The fuel metering valve 2840 then draws the desired dose of fuel from the fuel cell 2820 through the fuel valve stem and into the fuel cell receiving block 2860. This dose of fuel is then transported through the fuel cell receiving block 2860, through the fuel line, and into the combustion chamber of the tool 2050.

In illustrated example fastener driving tool 2050, the first pivot pin receiving member 2134a and the second pivot pin receiving member 2134b of the housing cap 2130 provide rigid support to the first dosing lever pivot pin 2836a and the second dosing lever pivot pin 2836b of the fuel dosing lever 2830. Such rigid support enables each actuation cycle of the fuel dosing lever 2830 to provide stable, repeatable and consistent forces to the fuel cell receiving block 2860. As a result, each actuation cycle of the fuel dosing lever 2830 causes the fuel metering valve 2840 to deliver a consistent dose of fuel from the fuel cell 2820 to the combustion chamber of the tool 2050.

Once the dose of fuel is delivered to the combustion chamber activation of the trigger 2410 sparks or otherwise ignites the delivered dose of fuel in the combustion chamber. This fuel ignition generates combustion energy that is directed downward from the combustion chamber into the cylinder. The combustion energy acts on a piston (not shown) within the cylinder to drive the piston downward through the cylinder. The piston contacts a fastener (not shown) positioned in the nosepiece assembly 2700 and drives the fastener into the workpiece.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fastener driving tool comprising:
   a main housing;
   a fastener driving assembly connected to the main housing;
   a handle assembly connected to the main housing;
   a trigger assembly connected to the main housing;
   a workpiece contact assembly connected to the main housing; and
   a fuel cell receiving assembly partially positioned in and connected to the main housing, the fuel cell receiving assembly including:
      a fuel cell door pivotally connected to the main housing,
      a fuel cell receiver connected to and in fluid communication with a fuel valve stem defining a lower portion of a fuel cell metering valve, the fuel cell receiver positioned in the main housing to receive and engage the fuel cell metering valve of a fuel cell, the fuel cell metering valve configured to dispense a dose of fuel from the fuel cell, and
   a fuel dosing lever within the main housing, separate from the fuel cell door, and pivotable about a pivot point to exert an axial force on the fuel cell receiver, the pivot point of the fuel dosing lever being independent from the fuel cell door, wherein the fuel dosing lever includes:
      a dosing lever base;
      a first dosing lever arm connected to a first end of the dosing lever base;
      a second dosing lever arm connected to a second end of the dosing lever base;
      a first dosing lever pivot pin connected to and transversely extending from the first dosing lever arm;
      a second dosing lever pivot pin connected to and transversely extending from the second dosing lever arm;
      a first dosing lever engagement end connected to the first dosing lever arm; and
      a second dosing lever engagement end connected to the second dosing lever arm.

2. The fastener driving tool of claim 1, wherein the dosing lever base is engageable with the fuel cell receiver to exert the force on the fuel cell metering valve.

3. The fastener driving tool of claim 1, wherein the fastener driving assembly includes a cylinder head, the cylinder head including:
   a cylinder head body;
   a first pivot pin receiving member connected to the cylinder head body, the first pivot pin receiving member positioned to receive the first dosing lever pivot pin; and
   a second pivot pin receiving member connected to the cylinder head body, the second pivot pin receiving member positioned to receive the second dosing lever pivot pin.

4. The fastener driving tool of claim 3, wherein the first pivot pin receiving member is monolithically formed with the cylinder head body, and wherein the second pivot pin receiving member is monolithically formed with the cylinder head body.

5. The fastener driving tool of claim 3, wherein the first dosing lever pivot pin is pivotally engaged with the first pivot pin receiving member and the second dosing lever pivot pin is pivotally engaged with the second pivot pin receiving member, and wherein the first pivot pin receiving member and the second pivot pin receiving member define the pivot point of the fuel dosing lever.

6. A fuel cell receiving assembly configured to be partially positioned in and connected to a main housing of a fastener driving tool, the main housing including a first wall, a second wall opposite the first wall, and a housing cap suitably connected to the first and second walls, the fuel cell receiving assembly comprising:
   a fuel cell door pivotally connectable to the main housing;
   a fuel cell receiver positionable in the main housing to receive and engage a fuel cell metering valve of a fuel cell, the fuel cell metering valve configured to dispense a dose of fuel from the fuel cell; and
   a fuel dosing lever positioned within the main housing and such that the fuel dosing lever is pivotable about a pivot point to exert an axial force on the fuel cell receiver by engaging a dosing lever base of the fuel dosing lever with the fuel cell receiver such that the pivot point of the fuel dosing lever is independent from the fuel cell door, wherein the fuel dosing lever includes:
      a first dosing lever arm connected to a first end of the dosing lever base;
      a second dosing lever arm connected to a second end of the dosing lever base;
      a first dosing lever pivot pin connected to and transversely extending from the first dosing lever arm;
      a second dosing lever pivot pin connected to and transversely extending from the second dosing lever arm;
      a first dosing lever engagement end connected to the first dosing lever arm; and
      a second dosing lever engagement end connected to the second dosing lever arm.

7. The fuel cell receiving assembly of claim 6, wherein the dosing lever base is positionable to engage the fuel cell receiver to exert the force on the fuel cell metering valve.

8. The fuel cell receiving assembly of claim 6, wherein the first dosing lever pivot pin and the second dosing lever pivot pin are supportable by a cylinder head of the fastener driving tool, wherein the cylinder head includes:
   a cylinder head body;
   a first pivot pin receiving member connected to the cylinder head body, the first pivot pin receiving member positioned to receive the first dosing lever pivot pin; and
   a second pivot pin receiving member connected to the cylinder head body, the second pivot pin receiving member positioned to receive the second dosing lever pivot pin.

9. The fuel cell receiving assembly of claim 8, wherein the first pivot pin receiving member is monolithically formed with the cylinder head body, and wherein the second pivot pin receiving member is monolithically formed with the cylinder head body.

10. The fuel cell receiving assembly of claim 8, wherein the first dosing lever pivot pin is pivotally engageable with the first pivot pin receiving member and the second dosing lever pivot pin is pivotally engageable with the second pivot pin receiving member.

11. The fuel cell receiving assembly of claim 8, wherein the first pivot pin receiving member and the second pivot pin receiving member of the cylinder head define the pivot point of the fuel dosing lever.

12. A fastener driving tool comprising:
   a main housing including a first wall, a second wall and a housing cap suitably connected to the first and second walls;
   a fastener driving assembly connected to the main housing;
   a handle assembly connected to the main housing;
   a trigger assembly connected to the main housing;
   a workpiece contact assembly connected to the main housing;
   a fuel cell receiving assembly partially positioned in and connected to the main housing, the fuel cell receiving assembly including:
      a fuel cell door pivotally connected to the main housing,
      a fuel cell receiver connected to and in fluid communication with a fuel valve stem defining a lower portion of a fuel cell metering valve, the fuel cell receiver positioned in the main housing to receive and engage the fuel cell metering valve of a fuel cell, the fuel cell metering valve configured to dispense a dose of fuel from the fuel cell, and
      a fuel dosing lever positioned within the main housing and fuel cell door, and pivotable about a pivot point to exert an axial force on the fuel cell receiver, the pivot point of the fuel dosing lever being independent from the fuel cell door, wherein the fuel dosing lever includes:
         a dosing lever base engageable with the fuel cell receiver to exert the axial force on the fuel cell metering valve,
         a first dosing lever arm connected to a first end of the dosing lever base,
         a second dosing lever arm connected to a second end of the dosing lever base,
         a first dosing lever pivot pin connected to and transversely extending from the first dosing lever arm,
         a second dosing lever pivot pin connected to and transversely extending from the second dosing lever arm,
         a first dosing lever engagement end connected to the first dosing lever arm, and
         a second dosing lever engagement end connected to the second dosing lever arm; and
      a cylinder head including:
         a cylinder head body,
         a first pivot pin receiving member connected to the cylinder head body, the first pivot pin receiving member positioned to receive the first dosing lever pivot pin, and
         a second pivot pin receiving member connected to the cylinder head body, the second pivot pin receiving member positioned to receive the second dosing lever pivot pin,
         wherein the first dosing lever pivot pin is pivotally engaged with the first pivot pin receiving member and the second dosing lever pivot pin is pivotally engaged with the second pivot pin receiving member,
         wherein the first pivot pin receiving member and the second pivot pin receiving member define the pivot point of the fuel dosing lever, and
         wherein the axial force on the fuel cell receiver is caused by engagement of the dosing level base and the fuel cell receiver.

13. The fastener driving tool of claim 12, wherein the first pivot pin receiving member is monolithically formed with the cylinder head body, and wherein the second pivot pin receiving member is monolithically formed with the cylinder head body.

14. The fastener driving tool of claim 12, wherein the engagement of the dosing level base and the fuel cell receiver comprises depression of a fuel valve stem within the fuel cell metering valve.

* * * * *